(12) United States Patent
Kano

(10) Patent No.: US 9,300,935 B2
(45) Date of Patent: Mar. 29, 2016

(54) IMAGE PROCESSING APPARATUS CAPABLE OF REDUCING DIFFERENCES OF COLOR CHARACTERISTICS BETWEEN INTERCHANGEABLE LENSES USING WHITE BALANCE ADJUSTMENT AND CONTROL METHOD THEREOF

(71) Applicant: CANON KABUSHIKI KAISHA, Tokyo (JP)

(72) Inventor: Akira Kano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 56 days.

(21) Appl. No.: 13/930,906

(22) Filed: Jun. 28, 2013

(65) Prior Publication Data

US 2014/0022411 A1    Jan. 23, 2014

(30) Foreign Application Priority Data

Jul. 19, 2012    (JP) .................................. 2012-160942

(51) Int. Cl.
 *H04N 9/73* (2006.01)
 *H04N 5/232* (2006.01)

(52) U.S. Cl.
 CPC ............. *H04N 9/73* (2013.01); *H04N 5/23203* (2013.01); *H04N 5/23209* (2013.01); *H04N 9/735* (2013.01)

(58) Field of Classification Search
 None
 See application file for complete search history.

(56) References Cited

U.S. PATENT DOCUMENTS

| | | | | |
|---|---|---|---|---|
| 4,426,147 A | * | 1/1984 | Shiozawa et al. | ................ 396/63 |
| 4,851,897 A | * | 7/1989 | Inuma | ..................... G03B 17/14 348/224.1 |
| 5,016,093 A | * | 5/1991 | Yoshida | ..................... 348/224.1 |
| 7,009,641 B2 | * | 3/2006 | Takahashi | .............. H04N 9/045 348/223.1 |
| 7,580,061 B2 | * | 8/2009 | Toyoda | .................. H04N 9/735 348/211.14 |
| 2003/0001958 A1 | * | 1/2003 | Hoshuyama | ........... H04N 9/735 348/223.1 |

(Continued)

FOREIGN PATENT DOCUMENTS

| | | |
|---|---|---|
| EP | 0335623 A2 | 10/1989 |
| EP | 1608140 A1 | 12/2005 |

(Continued)

OTHER PUBLICATIONS

Partial European Search Report issued on Jan. 29, 2014, that issued in the corresponding European Patent Application No. 13176723.8.

(Continued)

*Primary Examiner* — Shahbaz Nazrul

(74) *Attorney, Agent, or Firm* — Cowan, Liebowitz & Latman, P.C.

(57) ABSTRACT

Provided is an image processing apparatus that corrects differences in the tints of captured images caused by differences in the color characteristics of lenses used to shoot the images, as well as a control method for such an apparatus. The type of an interchangeable lens used to shoot an image is determined from a plurality of types of interchangeable lenses having different color characteristics. The influence of differences in the color characteristics of the interchangeable lenses on the tint of the image is then reduced by setting at least one of white balance coefficients used in white balance adjustment of the image and conversion characteristics of a color space conversion process applied to the image to correspond to the type of the interchangeable lens used to shoot the image.

8 Claims, 15 Drawing Sheets

(56) References Cited

U.S. PATENT DOCUMENTS

| | | | |
|---|---|---|---|
| 2003/0048374 A1 | 3/2003 | Minakuti | |
| 2004/0012690 A1 | 1/2004 | Makioka | |
| 2004/0017594 A1* | 1/2004 | Suekane et al. | 358/516 |
| 2005/0268000 A1 | 12/2005 | Carlson | |
| 2011/0267494 A1* | 11/2011 | Ogawa | 348/223.1 |
| 2011/0317043 A1* | 12/2011 | On | 348/241 |

FOREIGN PATENT DOCUMENTS

| | | |
|---|---|---|
| JP | H06-245214 A | 9/1994 |
| JP | 2003-078794 A | 3/2003 |
| JP | 2004-187246 A | 7/2004 |
| JP | 2004-304695 A | 10/2004 |
| JP | 2004-320148 A | 11/2004 |
| JP | 43377161 B | 9/2009 |
| TW | 200818917 A | 4/2008 |

OTHER PUBLICATIONS

Search Report issued on Jun. 24, 2014, that issued in the corresponding European Patent Application No. 13176723.8.
Jun. 12, 2015 Taiwanese Office Action, that issued in Taiwanese Patent Application No. 102122520.
Aug. 20, 2015 Korean Office Action, that issued in Korean Patent Application No. 10-2013-0082629.
Oct. 26, 2015 Japanese Office Action, that issued in Japanese Patent Application No. 2012160942.
European Office Action issued on Jul. 15, 2015, that issued in the corresponding European Patent Application No. 13176723.8.

* cited by examiner

| | | |
|---|---|---|
| LENS TYPE 1 | WHITE BALANCE COEFFICIENTS FOR SUNLIGHT | |
| LENS TYPE 1 | WHITE BALANCE COEFFICIENTS FOR SHADE | |
| LENS TYPE 1 | WHITE BALANCE COEFFICIENTS FOR CLOUDY | LENS TYPE 1 REGION |
| | ⋮ | |
| | ⋮ | |
| | ⋮ | |
| LENS TYPE 2 | WHITE BALANCE COEFFICIENTS FOR SUNLIGHT | |
| LENS TYPE 2 | WHITE BALANCE COEFFICIENTS FOR SHADE | |
| LENS TYPE 2 | WHITE BALANCE COEFFICIENTS FOR CLOUDY | LENS TYPE 2 REGION |
| | ⋮ | |
| | ⋮ | |
| | ⋮ | |

Type0

Type1

Type2

Type3

Type4

Type5

| (R000, G000, B000) |
| (R001, G001, B001) |
| (R002, G002, B002) |
| : |
| (R007, G007, B007) |
| (R010, G010, B010) |
| : |
| : |
| (R777, G777, B777) |

} LENS TYPE 1 3D-LUT

| (R000, G000, B000) |
| (R001, G001, B001) |
| (R002, G002, B002) |
| : |
| (R007, G007, B007) |
| (R010, G010, B010) |
| : |
| : |
| (R777, G777, B777) |

} LENS TYPE 2 3D-LUT

START
↓
CONVERT WHITE BALANCE COEFFICIENTS THAT CORRESPOND TO LENS TYPE — S130
↓
WHITE BALANCE ADJUSTMENT — S131
↓
COLOR DARKNESS AND COLOR TONE ADJUSTMENTS — S132
↓
APPLY 3D-LUT — S133
↓
END

WHITE DETECTION RANGE IN
THE CASE OF LENS TYPE 1

WHITE DETECTION RANGE IN
THE CASE OF LENS TYPE 2

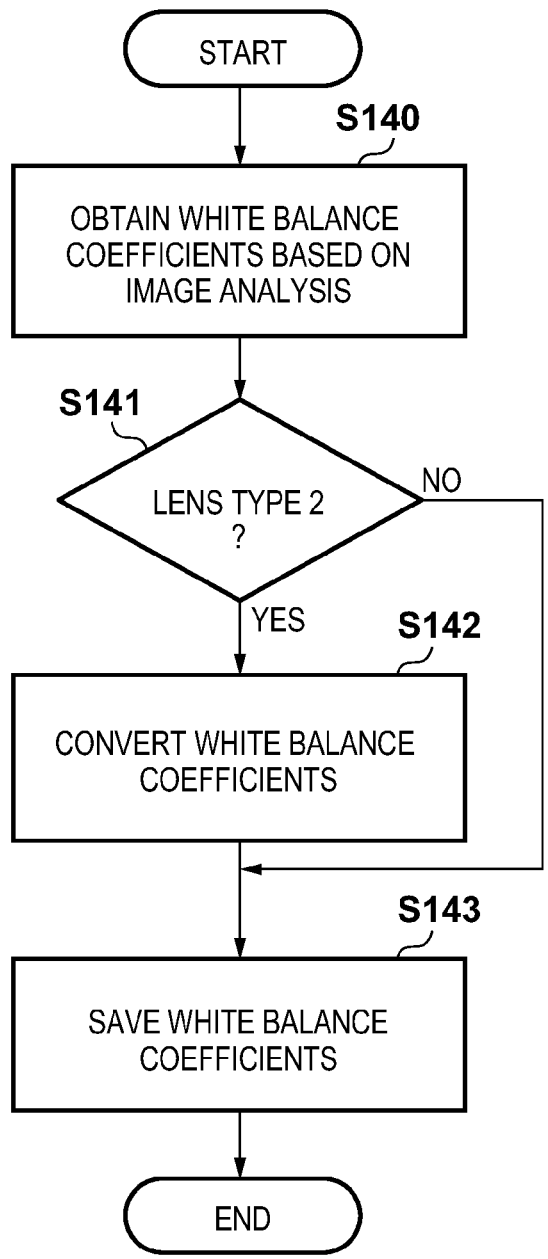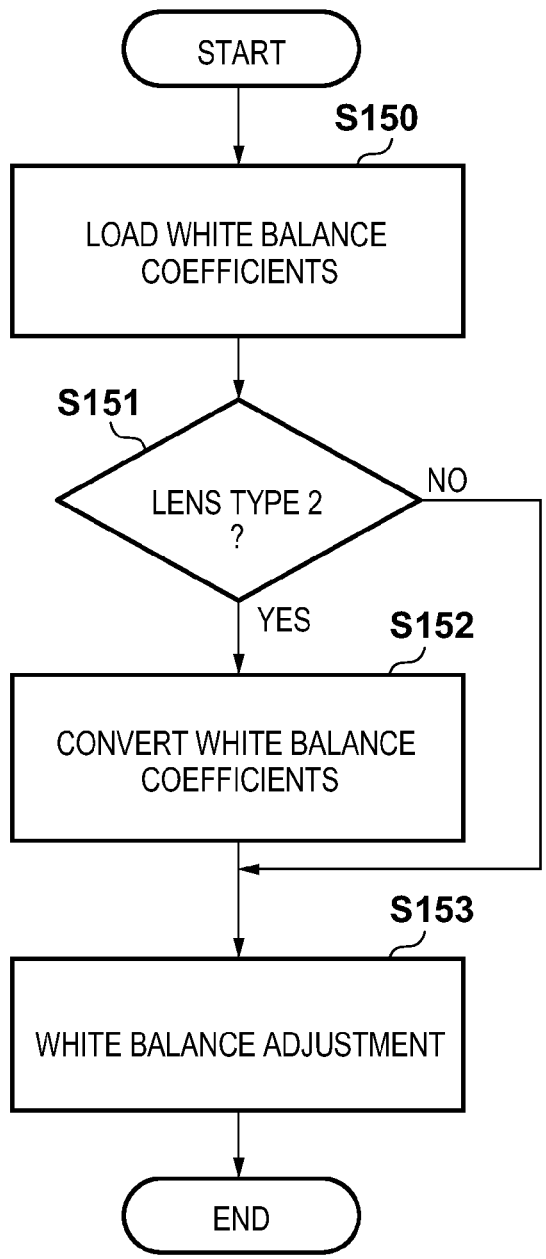

F I G. 17A

[WHITE BALANCE COEFFICIENTS(GainR, GainG, GainB)]
WB01 : 1.86, 1.00, 1.49 (FOR SUNLIGHT)
WB02 : 2.25, 1.00, 1.22 (FOR SHADE)
WB03 : 2.06, 1.00, 1.37 (FOR CLOUDY)
...

[LENS TYPE DURING SHOOTING]
LensType : 1

[CONVERSION COEFFICIENTS]
AdjR : 1.000
AdjG : 1.000
AdjB : 1.000

F I G. 17B

[WHITE BALANCE COEFFICIENTS(GainR, GainG, GainB)]
WB01 : 1.98, 1.00, 1.54 (FOR SUNLIGHT)
WB02 : 2.40, 1.00, 1.26 (FOR SHADE)
WB03 : 2.19, 1.00, 1.41 (FOR CLOUDY)
...

[LENS TYPE DURING SHOOTING]
LensType : 2

[CONVERSION COEFFICIENTS]
AdjR : 1.065
AdjG : 1.000
AdjB : 1.032

IMAGE PROCESSING APPARATUS CAPABLE OF REDUCING DIFFERENCES OF COLOR CHARACTERISTICS BETWEEN INTERCHANGEABLE LENSES USING WHITE BALANCE ADJUSTMENT AND CONTROL METHOD THEREOF

BACKGROUND OF THE INVENTION

1. Field of the Invention

The present invention relates to image processing apparatuses and control methods thereof, and an image capture apparatus. The present invention particularly relates to techniques for reducing differences in the tints of captured images caused by the optical properties of a lens unit.

2. Description of the Related Art

In digital cameras, images used for recording, display, and the like are generated by performing image processing such as white balance adjustment and color processing on RAW images obtained by an image sensor such as a CCD.

White balance adjustment refers to a process that adjusts the gain of respective red (R), green (G), and blue (B) signal values obtained from the image sensor, whereas color processing refers to a process for adjusting the darkness and color tone of colors, a color conversion process that employs a three-dimensional lookup table (3D-LUT), or the like.

White balance adjustment, color processing, and the like are carried out in order to correctly express the tint of a subject by correcting the color cast, drops in color reproducibility, and so on of a captured image.

Although the color temperature of the light source and the spectral characteristics of the image sensor are the primary causes of changes in the tint of captured images, other factors exist as well. Japanese Patent No. 4337161 proposes setting the white balance based on image shooting conditions, such as a pupil position and an aperture value, in order to reduce color cast in a captured image caused by changes in the angle at which light rays are incident on the microlenses of a CCD that result from the image shooting conditions.

The tint of the captured image is furthermore affected by the spectral transmittance of the imaging lens. With a camera that has interchangeable lenses, there are cases where the spectral transmittance differs depending on the type of interchangeable lens that is attached to the camera.

For example, there are interchangeable lenses that can be attached to multiple types of cameras, such as interchangeable lenses that can be attached to both film cameras and digital cameras. Film cameras are different from digital cameras in that white balance adjustment, color processing, and so on cannot be carried out at will. In order to prevent the tint of captured images from changing greatly depending on the type of interchangeable lens that is attached, the optical members in interchangeable lenses that can be attached to film cameras are designed so that the color characteristics resulting from the spectral transmittance fall within a given constant range.

On the other hand, white balance adjustment, color reproducibility processing, and so on can be carried out at will in digital cameras, and thus interchangeable lenses that can be attached only to digital cameras need not have the same color characteristics resulting from the spectral transmittance as interchangeable lenses that can be attached to film cameras. There are cases where effects such as miniaturization, a reduction in aberration, and so on can be achieved by designing the spectral transmittance with a certain degree of freedom.

An example of the color characteristics of interchangeable lenses is shown in FIG. 2. FIG. 2 illustrates color characteristics of lenses computed for a given light source, based on relative spectral distributions of the light source and the spectral transmittances of the lenses. Here, a lens type 1 indicates an interchangeable lens that can be attached to both a film camera and a digital camera, whereas a lens type 2 indicates an interchangeable lens that can be attached only to a digital camera. Although there are various types of interchangeable lenses that are classified as lens type 1 lenses, the respective color characteristics thereof are distributed within a distribution region central to a point a in FIG. 2. Like the lens type 1, there are various types of interchangeable lenses that are classified as lens type 2 lenses, and the respective color characteristics thereof are distributed within a distribution region central to a point b in FIG. 2.

Because both the lens type 1 and the lens type 2 can be attached to digital cameras, there are digital cameras to which both lens types can be attached. Although it is necessary for the shape of the lens mount to actually fit, there are also cases where a lens can be attached by using a conversion adapter.

However, a camera to which such interchangeable lenses that have different color characteristics can be attached has a problem in that the tint of captured images will differ depending on the lens that is attached. Although the conventional technique disclosed in Japanese Patent No. 4337161 discusses correcting changes in the tint caused by differences in image shooting conditions such as the aperture value, the pupil position, and so on, Japanese Patent No. 4337161 neither discloses nor suggests changes in the tint caused by the spectral transmittance of the imaging lens or a method for correcting such changes.

SUMMARY OF THE INVENTION

Having been achieved in light of such problems with conventional techniques, the present invention provides an image processing apparatus that corrects differences in the tints of captured images caused by differences in the color characteristics of lenses used to shoot the images, as well as a control method for such an apparatus.

According to an aspect of the present invention, there is provided an image processing apparatus comprising: a determination unit adapted to determine a type of an interchangeable lens used to shoot an image from a plurality of types of interchangeable lenses having different color characteristics; and an image processing unit adapted to apply white balance adjustment and a color space conversion process to the image, wherein the image processing unit reduces the influence of differences in the color characteristics of the interchangeable lenses on the tint of the image by setting at least one of white balance coefficients used in the white balance adjustment and conversion characteristics of the color space conversion process to correspond to the type of the interchangeable lens used to shoot the image.

According to another aspect of the present invention, there is provided a control method for an image processing apparatus, the method comprising: a determination step of determining a type of an interchangeable lens used to shoot an image from a plurality of types of interchangeable lenses having different color characteristics; and an image processing step of applying white balance adjustment and a color space conversion process to the image, wherein the image processing step reduces the influence of differences in the color characteristics of the interchangeable lenses on the tint of the image by setting at least one of white balance coefficients used in the white balance adjustment and conversion characteristics of the color space conversion process to correspond to the type of the interchangeable lens used to shoot the image.

Further features of the present invention will become apparent from the following description of exemplary embodiments (with reference to the attached drawings).

BRIEF DESCRIPTION OF THE DRAWINGS

FIGS. 14A and 14B are flowcharts illustrating an example of a manual white balance coefficient registration process performed by the image processing unit according to the first embodiment of the present invention.

FIGS. 17A and 17B are diagrams illustrating examples of information recorded in the header of a RAW image file according to the second embodiment of the present invention.

DESCRIPTION OF THE EMBODIMENTS

Exemplary embodiments of the present invention will now be described in detail in accordance with the accompanying drawings.

First Embodiment

Figure 1:
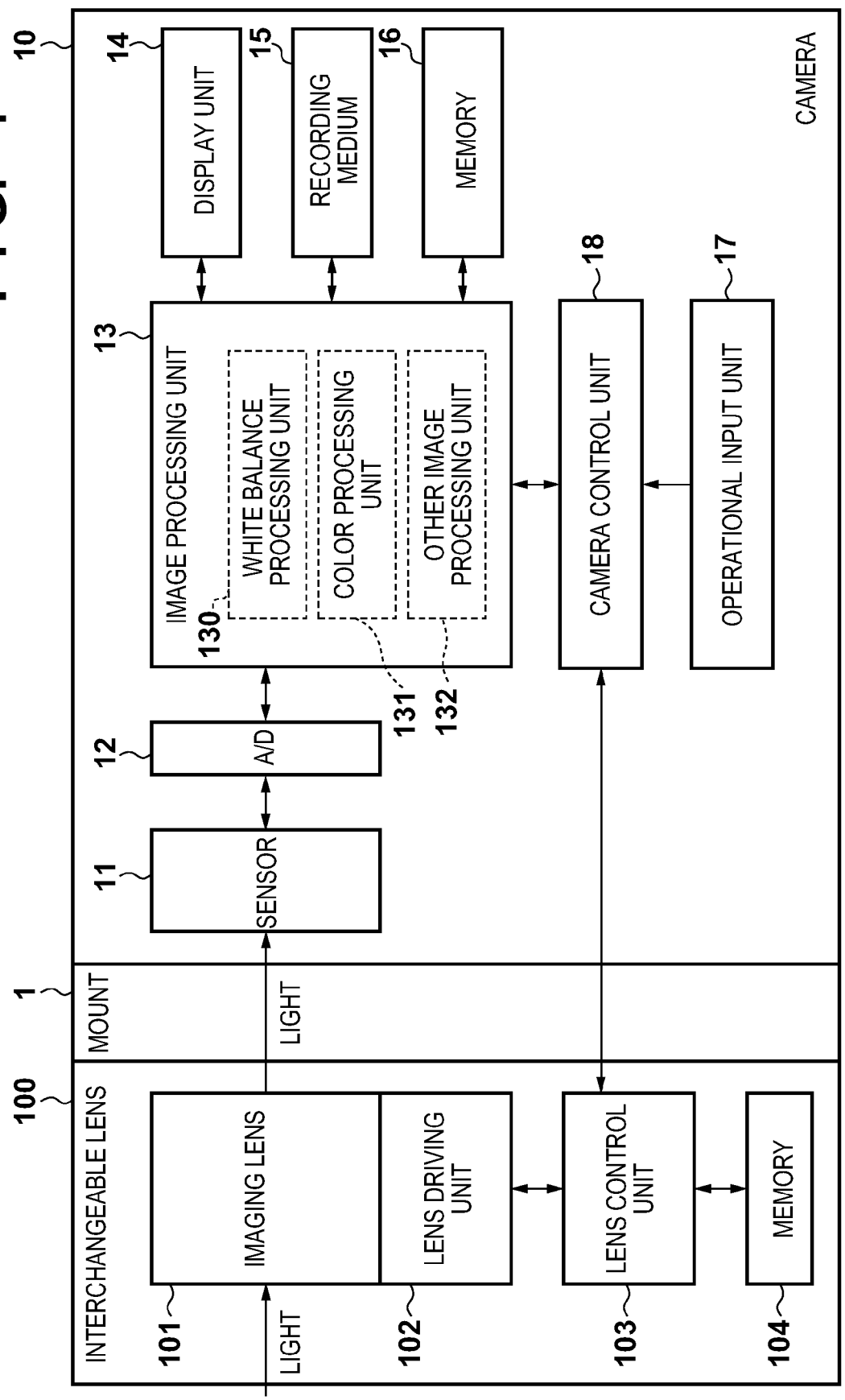
FIG. 1 is a block diagram illustrating an example of the functional configuration of an interchangeable lens-type digital camera system serving as an example of an image processing apparatus according to a first embodiment of the present invention.
Figure 2:
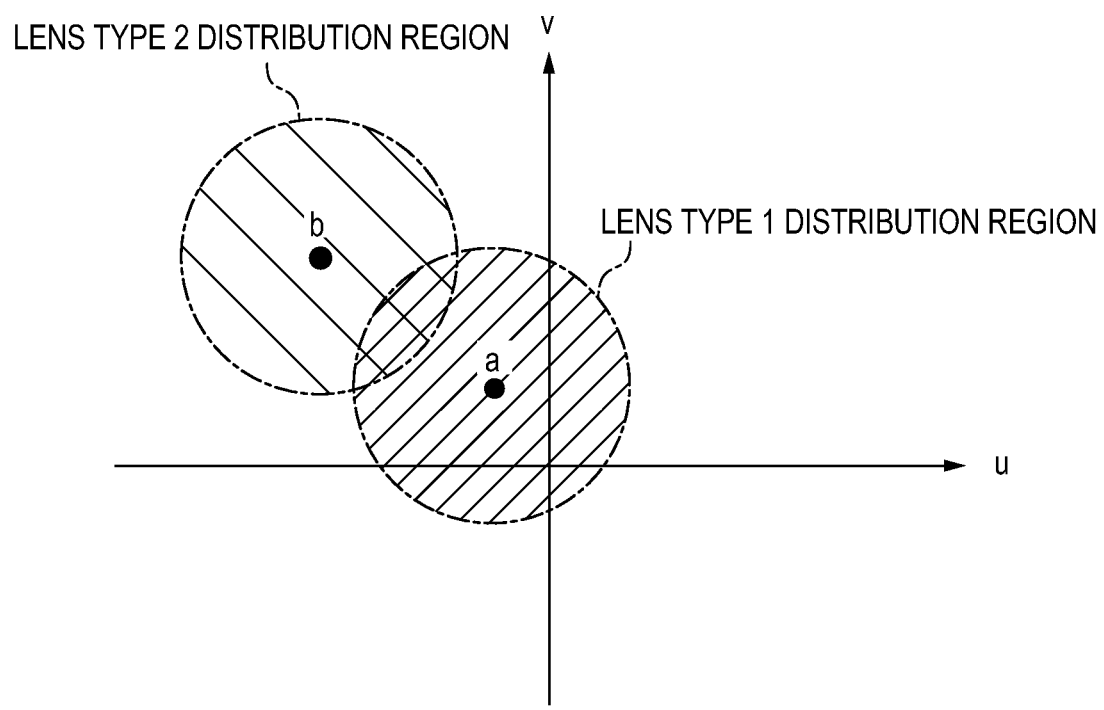
FIG. 2 is a diagram illustrating an example of color characteristics of interchangeable lenses.

FIG. 1 is a block diagram illustrating an example of the functional configuration of an interchangeable lens-type digital camera system serving as an example of an image processing apparatus according to a first embodiment of the present invention. The camera system is configured of a camera 10 and an interchangeable lens 100, which is a lens unit that can be attached to/removed from the camera 10. A mount 1 is a mechanism for attaching the interchangeable lens 100 to the camera 10 in a removable state, and includes electrical connection points for enabling the camera 10 to supply power to the interchangeable lens 100, enabling the camera 10 and the interchangeable lens 100 communicate with each other, and so on. The mount 1 is divided into a section provided in the camera 10 and a section provided in the interchangeable lens 100, but is illustrated in FIG. 1 as a single unit for the sake of simplicity.

An image sensor 11 is a photoelectric conversion device having a plurality of pixels. The image sensor 11 uses each pixel to perform photoelectric conversion on a subject image formed by an imaging lens 101 within the interchangeable lens 100, and outputs an analog electrical signal corresponding to the subject image. An A/D conversion unit 12 converts the analog electrical signal output from the image sensor 11 into a digital signal. An image processing unit 13 generates image data by applying various types of image processing to the digital signal output by the A/D conversion unit 12. The image processing unit 13 is configured of a white balance processing unit 130, a color processing unit 131, and another image processing unit 132. The white balance processing unit 130 performs a process for adjusting R, G, and B color ratios by applying gain to R, G, and B signals that configure an image input into the image processing unit 13. The color processing unit 131 performs color conversion processing such as adjusting the darkness and color tone of colors using, for example, a 3D-LUT. The other image processing unit 132 carries out development processing such as pixel interpolation processing, brightness adjustment processing, gamma processing, and so on. The image data generated by the image processing unit 13 is displayed in a display unit 14, recorded in a recording medium 15 such as a memory card, or the like.

A memory 16 is used as a processing buffer for the image processing unit 13, and as a storage device for programs executed by a camera control unit 18, which will be mentioned later. The memory 16 is also used as a storage device for white balance coefficients, conversion coefficients, and the 3D-LUT used by the white balance processing unit 130 and the color processing unit 131, and as a storage device for GUI data, such as menu screens, displayed by the camera 10 in the display unit 14.

An operation input unit 17 is an input device group through which a user inputs instructions to the camera 10, and includes a power switch for turning the power on/off, a shooting switch for starting the recording of images, a select/OK switch for making settings in various types of menus, and so on. The camera control unit 18 includes a microcomputer, and controls the overall operations of the camera system, such as controlling the image processing unit 13 and controlling communications with the interchangeable lens 100, by executing programs stored in the memory 16.

A lens driving unit 102 provided in the interchangeable lens 100 drives an actuator, a motor, and the like of the imaging lens 101 under the control of a lens control unit 103. The actuator, motor, and the like of the imaging lens 101 move or operate a focus lens, a zoom lens, an aperture, an image stabilization lens, and so on provided in the imaging lens 101. The lens control unit 103 includes a microcomputer, and controls the lens driving unit 102 in accordance with control signals received from the camera control unit 18 via the mount 1. A memory 104 is used as a storage device for various types of data used by the lens control unit 103. Note that it is assumed that two types of interchangeable lenses can be attached to an image capture apparatus according to the present embodiment.

Figure 3:
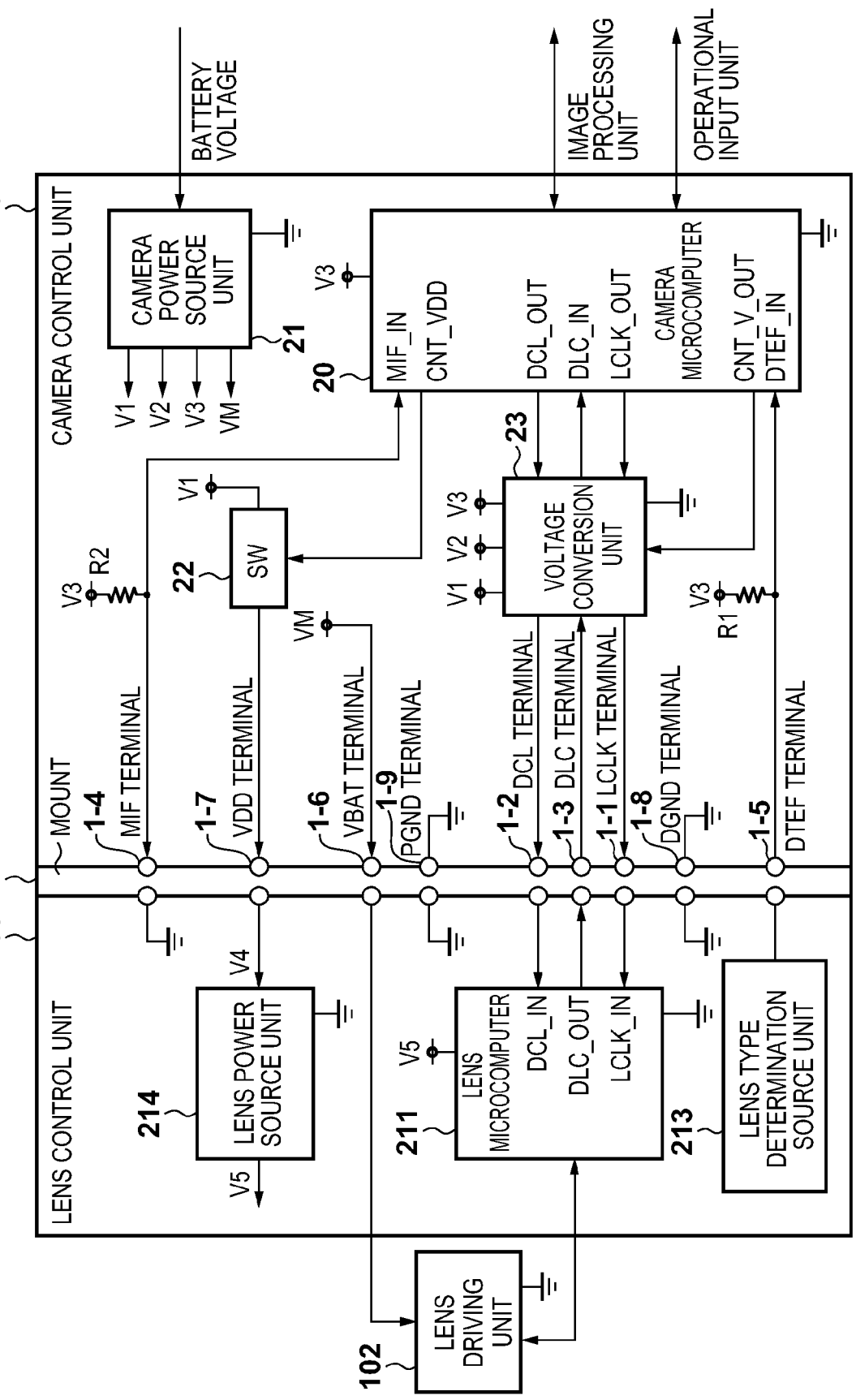
FIG. 3 is a block diagram illustrating an example of a configuration for communication between a camera control unit and a lens control unit according to the first embodiment of the present invention.

FIG. 3 is a block diagram illustrating an example of a configuration for communication between the camera control unit 18 and the lens control unit 103 shown in FIG. 1.

First, terminals provided in the mount 1 will be described.

An LCLK terminal 1-1 is a terminal for a communication clock signal output to the interchangeable lens 100 from the camera 10. A DCL terminal 1-2 is a terminal for communication data output to the interchangeable lens 100 from the camera 10. A DLC terminal 1-3 is a terminal for communication data output to the camera 10 from the interchangeable lens 100.

An MIF terminal 1-4 is a terminal for detecting that the interchangeable lens 100 has been attached to the camera 10. A microcomputer (called a camera microcomputer hereinafter) 20 within the camera control unit 18 detects that the interchangeable lens 100 has been attached to the camera 10 based on a voltage from the MIF terminal 1-4.

A DTEF terminal 1-5 is a terminal for detecting the type of the interchangeable lens 100 attached to the camera 10. The camera microcomputer 20 detects the type of the interchangeable lens 100 attached to the camera 10 based on a voltage from the DTEF terminal 1-5.

A VBAT terminal 1-6 is a terminal for supplying driving power (VM) used in various types of operations aside from communication control from the camera 10 to the interchangeable lens 100. A VDD terminal 1-7 is a terminal that supplies communication control power (VDD) used in communication control from the camera 10 to the interchangeable lens 100. A DGND terminal 1-8 is a terminal that connects the communication control system between the camera 10 and the interchangeable lens 100 to a ground. A PGND terminal 1-9 is a terminal for connecting mechanical driving systems, including the actuator, motor, and the like provided in the camera 10 and the interchangeable lens 100, to a ground.

A plurality of types of interchangeable lenses 100 having different communication voltages with the camera 10 can be attached to the camera 10 according to the present embodiment. For the sake of simplicity, and to facilitate understanding, the following descriptions assume that there are two types of interchangeable lenses 100 identified by the camera 10 based on the voltage at the DTEF terminal 1-5, namely a first interchangeable lens (a lens type 1) and a second interchangeable lens (a lens type 2). The second interchangeable lens has a different communication voltage than the first interchangeable lens.

Note that the "type" detected based on the voltage at the DTEF terminal 1-5 refers to a "type" classified based on the color characteristics resulting from differences in the spectral transmittances of the lenses, and does not necessarily correspond to what is known as the "model type".

A camera power source unit 21 provided in the camera control unit 18 converts a battery voltage supplied from a battery installed in the camera 10 to a voltage required to operate the respective constituent elements. In the present embodiment, it is assumed that the camera power source unit 21 generates voltages V1, V2, V3, and VM.

The first voltage V1 is a power voltage that serves as the communication control voltage (VDD) for the first and second interchangeable lenses, and serves as the communication voltage of the first interchangeable lens. The second voltage V2 serves as the communication voltage of the second interchangeable lens. The 3rd voltage V3 is a power voltage serving as operational power for the camera microcomputer 20. The 4th voltage VM is a power voltage serving as a driving voltage for the first and second interchangeable lenses.

When the power is instructed to be turned on using the power switch of the operation input unit 17, the camera microcomputer 20 outputs a signal for turning a switch 22 on from a CNT_VDD_OUT terminal, and starts the supply of VDD and VM from the camera 10 to the interchangeable lens 100. When the power is instructed to be turned off, the camera microcomputer 20 turns the switch 22 off by stopping the signal output from the CNT_VDD_OUT terminal, and stops the supply of VDD and VM from the camera 10 to the interchangeable lens 100.

The camera microcomputer 20 communicates with the interchangeable lens 100 via a voltage conversion unit 23. The camera microcomputer 20 includes an LCLK_OUT terminal that outputs a communication clock signal, a DCL_OUT terminal that outputs communication data to the interchangeable lens, and a DLC_IN terminal that accepts the input of communication data from the interchangeable lens. The communication clock signal and the communication data are communication signals.

The camera microcomputer 20 also includes an MIF_IN terminal for detecting that the interchangeable lens 100 has been attached, a DTEF_IN terminal for identifying the type of the interchangeable lens 100, and a CNT_V_OUT terminal that outputs a communication voltage switching signal to the voltage conversion unit 23.

Furthermore, the camera microcomputer 20 includes the CNT_VDD_OUT terminal that outputs signals for turning the switch 22 on and off, a terminal for connecting to the image processing unit 13, and a terminal for connecting to the operation input unit 17.

A microcomputer 211 in the lens control unit 103 (called a lens microcomputer hereinafter) communicates with the camera microcomputer 20 via the voltage conversion unit 23 of the camera control unit 18. The lens microcomputer 211 includes an LCLK_IN terminal that accepts the input of the communication clock signal, a DLC_OUT terminal that outputs communication data to the camera 10, a DCL_IN terminal that accepts the input of communication data from the camera 10, and a terminal for connecting to the lens driving unit 102. In addition, the lens control unit 103 includes a lens power source unit 214 that generates an operational voltage for the lens microcomputer 211 from VDD.

Next, detecting the attachment of the interchangeable lens 100 to the camera 10 will be described. The MIF_IN terminal of the camera microcomputer 20 is pulled up to the power source by a resistance R2 (100 KΩ), and thus when the lens is not attached, the voltage value thereof is H (high). However, the MIF_IN terminal is connected to a GND in the interchangeable lens 100 when the interchangeable lens (the first and second interchangeable lenses) 100 is attached, and thus the voltage value thereof drops to L (low) when the interchangeable lens 100 is attached, regardless of the type of the interchangeable lens 100.

Figures 4A, 4B:
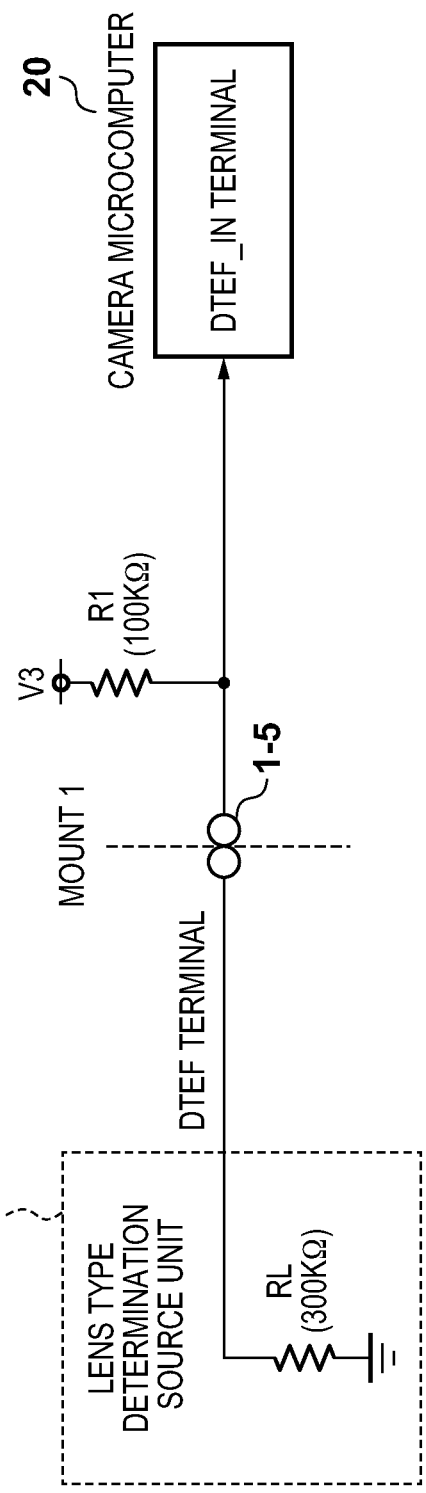
FIGS. 4A and 4B are diagrams illustrating examples of the configuration of a lens type determination source unit provided in the lens control unit according to the first embodiment of the present invention.

FIGS. 4A and 4B are diagrams illustrating examples of the configuration of a lens type determination source unit 213 provided in the lens control unit 103. The lens type determination source unit 213 is configured of an accessory-side resistance RL provided between the DTEF terminal provided in the mount 1 and a GND. The resistance value of the resistance RL is set in advance in accordance with the type of the interchangeable lens. For example, 0Ω is assumed at the resistance RL provided in the first interchangeable lens shown in FIG. 4A, whereas 300 KΩ is assumed at the resistance RL provided in the second interchangeable lens shown in FIG. 4B.

In the camera 10, a camera-side resistance R1 (at, for example, 100 KΩ) is connected between the DTEF terminal of the mount 1 and the operational power voltage (V3) of the camera microcomputer 20; furthermore, the DTEF terminal is connected to the DTEF_IN terminal of the camera microcomputer 20. The DTEF_IN terminal of the camera microcomputer 20 has an AD conversion function (here, a 10-bit AD conversion function with an input range of 0-1.0 V).

An operation performed by the camera microcomputer 20 for determining the type of the interchangeable lens will now be described. The camera microcomputer 20 determines the type of the attached interchangeable lens in accordance with the value of a voltage input into the DTEF_IN terminal. Specifically, the camera microcomputer 20 performs AD conversion on the input voltage value, and determines the lens type by comparing the AD-converted value with a lens type determination reference held by the camera microcomputer 20 in advance.

For example, in the case where the first interchangeable lens is attached, the AD-converted value of the voltage input into the DTEF_IN terminal is found to be approximately 0x0000, through a resistance ratio RL/(R1+RL) using the 100 KΩ of R1 and the 0Ω of RL. Accordingly, the camera microcomputer 20 detects that the AD-converted value of the DTEF_IN terminal is within a range of 0x0000 to 0x007F, which is a first lens type determination reference, and determines that the attached interchangeable lens is the first interchangeable lens.

On the other hand, in the case where the second interchangeable lens is attached, the AD-converted value of the voltage input into the DTEF_IN terminal is found to be approximately 0x02FF, through a resistance ratio RL/(R1+RL) using the 100 KΩ of R1 and 300 KΩ of RL. Accordingly, the camera microcomputer 20 detects that the AD-converted value of the DTEF_IN terminal is within a range of 0x0280 to 0x037F, which is a second lens type determination reference, and determines that the attached interchangeable lens is the second interchangeable lens.

As described earlier, the camera microcomputer 20 determines the type of the attached interchangeable lens 100 based on the value of a voltage input into the DTEF_IN terminal. The logic level of the signal output from the CNT_V_OUT terminal is then controlled in accordance with a result of the determination of the type of the interchangeable lens 100. Specifically, in the case where it has been determined from the voltage value at the DTEF_IN terminal that the attached interchangeable lens 100 is the first interchangeable lens, the camera microcomputer 20 controls the communication voltage to V1 by outputting an H level signal from the CNT_V_OUT terminal. On the other hand, in the case where it has been determined that the attached interchangeable lens 100 is the second interchangeable lens, the camera microcomputer 20 controls the communication voltage to V2 by outputting an L level signal from the CNT_V_OUT terminal.

In the case where a voltage value that is outside of the range of the aforementioned first and second lens type determination references has been detected as the voltage value (AD-converted value) at the DTEF_IN terminal, the camera microcomputer 20 determines that an "incompatible lens", which is an interchangeable lens that is not compatible with the camera 10, has been attached. Alternatively, a determination may be "reserved" under the assumption that the lens type determination cannot be correctly carried out. In this case, the camera microcomputer 20 does not communicate with the interchangeable lens 100.

Figure 5:
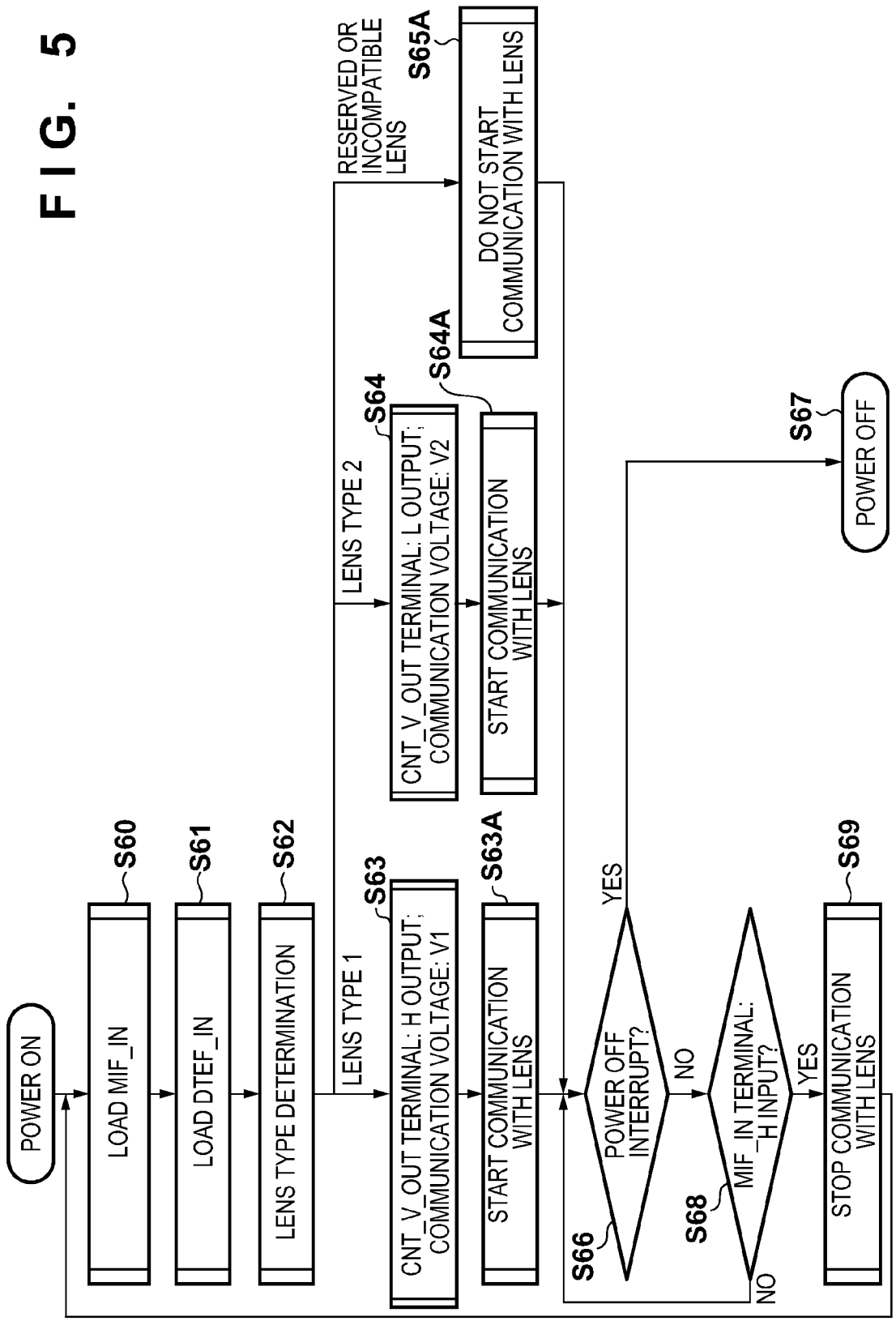
FIG. 5 is a flowchart illustrating a process for determining an interchangeable lens type performed by the camera control unit according to the first embodiment of the present invention.

FIG. 5 is a flowchart illustrating a process for determining the interchangeable lens type performed by the camera microcomputer 20 according to the present embodiment. The processing shown in FIG. 5 is performed by the camera microcomputer 20 executing programs stored in the memory 16.

The camera microcomputer 20 loads a voltage value H or L from the MIF_IN terminal in S60 and loads a voltage value from the DTEF_IN terminal in S61. Note that S60 and S61 may be executed simultaneously.

In the case where the voltage value at the MIF_IN terminal is L and the interchangeable lens 100 has been detected as being attached, in S62, the camera microcomputer 20 determines the type of the attached interchangeable lens 100 based on the (AD-conversion result of the) voltage value at the DTEF_IN terminal. In the case where it has been determined that the attached interchangeable lens 100 is the first interchangeable lens (indicated as "lens type 1" in FIG. 5), in S63, the camera microcomputer 20 sets the communication voltage to V1 by outputting H from the CNT_V_OUT terminal, and advances the processing to S63A. However, in the case where it has been determined that the attached interchangeable lens 100 is the second interchangeable lens (indicated as "lens type 2" in FIG. 5), in S64, the camera microcomputer 20 sets the communication voltage to V2 by outputting L from the CNT_V_OUT terminal, and advances the processing to S64A. Furthermore, in the case where the attached interchangeable lens 100 is neither the first nor the second interchangeable lens and a determination of "incompatible lens" or "reserved" has been made, the camera microcomputer 20 advances the processing to S65A.

In S63A and S64A, the camera microcomputer 20 starts communication with the interchangeable lens 100 using the set communication voltage. In S65A, the camera microcomputer 20 does not start communication with the attached interchangeable lens 100, and instead performs a process for issuing a warning or the like to the user.

In S66, the camera microcomputer 20 determines whether or not a power off interrupt has occurred due to the power switch of the operation input unit 17 being turned off; in the case where a power off interrupt has occurred, in S67, a power off process is carried out. On the other hand, in the case where a power off interrupt has not occurred, in S68, the camera microcomputer 20 determines whether or not the voltage at the MIF_IN terminal is H level, or in other words, whether or not the interchangeable lens 100 has been removed from the camera 10. In the case where an H level voltage has been input from the MIF_IN terminal, in S69, the camera microcomputer 20 stops communication with the interchangeable lens 100 and returns the processing to S60. However, in the case where an H level voltage is not input from the MIF_IN terminal, the camera microcomputer 20 returns the processing to S66.

The camera control unit 18 can determine the type of the interchangeable lens 100 that is attached by performing such communication processing.

Although the example in FIG. 5 illustrates a method in which the type of the attached interchangeable lens 100 is determined in accordance with the value of the voltage input to the DTEF_IN terminal, it should be noted that another determination method may be used. For example, information regarding a lens type may be received from the interchangeable lens 100 immediately after S63A and the lens type may be determined based thereon, without performing the lens type determination of S61 and S62 and the setting of the output voltage based on the lens type in S63A and S64A.

Next, a process for reducing a difference between the tints of captured images caused by differences in lens characteristics, carried out in a development process performed by the image processing unit 13, will be described.

Figure 6:
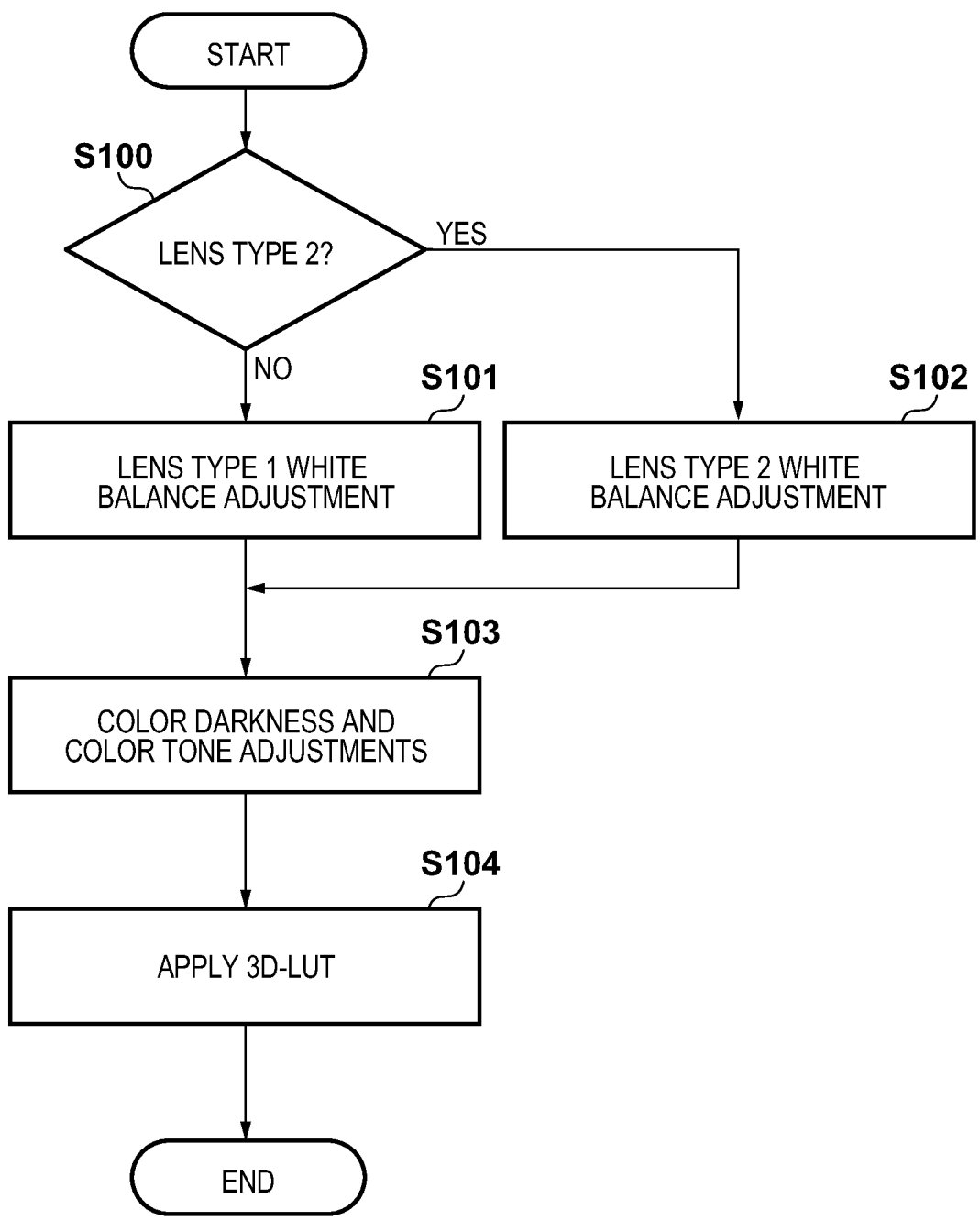
FIG. 6 is a flowchart illustrating a development process performed by an image processing unit according to the first embodiment of the present invention.

FIG. 6 is a flowchart illustrating an outline of the development process performed by the image processing unit 13.

First, in S100, the white balance processing unit 130 of the image processing unit 13 determines the lens type of the attached interchangeable lens 100. The lens type is determined based on the result of the determination performed by the camera control unit 18. Specifically, it is determined whether the interchangeable lens 100 is the lens type 2; the processing is advanced to S101 in the case where the interchangeable lens 100 is the lens type 1 or is an incompatible lens that is neither the lens type 1 nor the lens type 2, whereas the processing is advanced to S102 in the case where the interchangeable lens 100 is the lens type 2.

The white balance processing unit 130 applies white balance adjustment for the lens type 1 to the captured image in S101 and applies white balance adjustment for the lens type 2 to the captured image in S102. The white balance adjustment is a process for applying white balance coefficients based on a light source type to the R, G, and B values of each pixel in the captured image. The white balance coefficients based on the light source type can be held in advance in, for example, the memory 16; the light source type may be selected by the user, or may be automatically determined by the camera. In the present embodiment, white balance coefficients are prepared for each lens type in addition to each light source type, and the white balance processing unit 130 selects white balance coefficients based on the determined lens type and the light source type.

Note that the white balance coefficients correspond to gain values applied to the R, G, and B signals that configure the image. The R, G, and B white balance coefficients are taken as WbGainR, WbGainG, and WbGainB, respectively; pre-white balance adjustment R, G, and B values are taken as R0, G0, and B0, respectively; and post-white balance adjustment R, G, and B values are taken as R1, G1, and B1, respectively. In this case, the white balance adjustment process can be expressed as follows. The white balance adjustment is carried out by performing the calculations of the following formulas on all of the pixels in the image.

$$R1 = WbGainR \times R0 \quad \text{Formula 1}$$

$$G1 = WbGainG \times G0 \quad \text{Formula 2}$$

$$B1 = WbGainB \times B0 \quad \text{Formula 3}$$

Figures 7, 8:
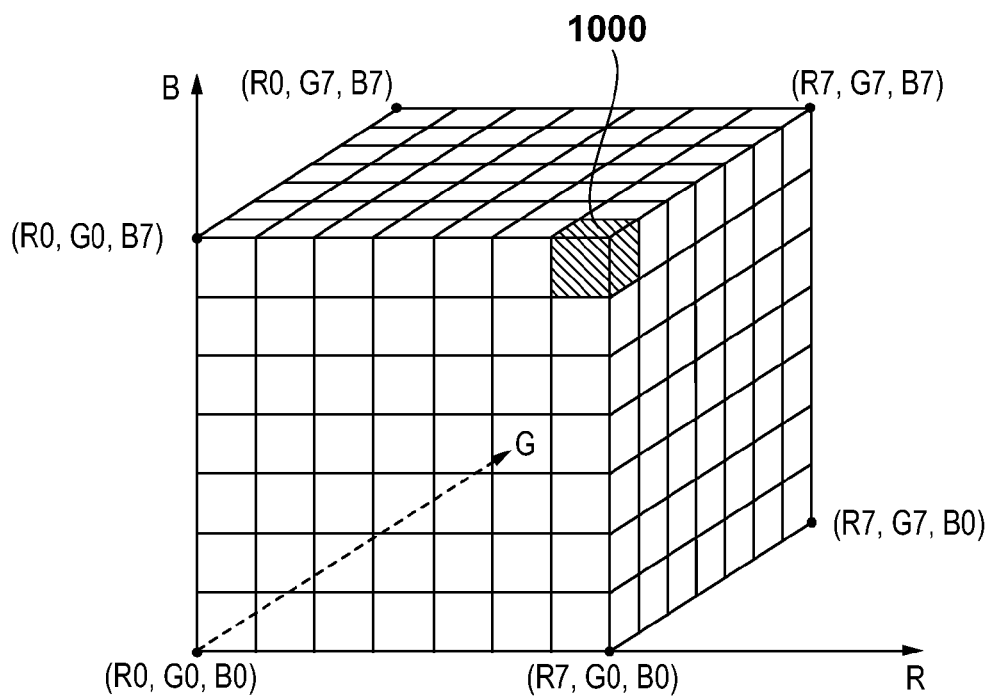
FIG. 7 is a diagram illustrating an example of the data structure of white balance coefficient data held in the first embodiment of the present invention.
FIG. 8 is a diagram schematically illustrating a 3D-LUT according to the first embodiment of the present invention as a color space.

FIG. 7 is a diagram illustrating an example of the data structure of white balance coefficient data held in the memory 16. As shown in FIG. 7, white balance coefficients corresponding to a plurality of light sources (sunlight, shade, cloudy, and so on) are held for each lens type. In other words, in the case where white balance adjustment is performed for a lens type 1 interchangeable lens, the white balance coefficients held in a lens type 1 region shown in FIG. 7 are used, in accordance with the light source. Likewise, in the case where lens type 2 white balance adjustment is performed, the white balance coefficients held in a lens type 2 region shown in FIG. 7 are used, in accordance with the light source. The optimum values for the lens type 1 white balance coefficients and the lens type 2 white balance coefficients may be found in advance through experimentation, taking into consideration the color characteristics of the respective lenses.

By switching the white balance coefficients that are used based on the lens type in this manner, color cast in images caused by the influence of color characteristics that differ among lens types can be reduced.

In S103, the color processing unit 131 adjusts the darkness and color tone of the colors in the image. In S104, the color processing unit 131 applies a color space conversion process using a 3D-LUT (three-dimensional lookup table). A 3D-LUT is a table defining characteristics for converting three-dimensional input values (R, G, and B) into three-dimensional output values (R, G, and B), and is stored in the memory 16.

The 3D-LUT, and a color space conversion method that employs three-dimensional interpolation processing, will now be described. Input digital image signals (R, G, and B) are separated into most significant bits and least significant bits. The most significant bits are used to obtain a plurality of reference values required for interpolation processing using the 3D-LUT. The least significant bits are used in the interpolation processing as weight coefficients g. Interpolated values are then calculated through a product-sum operation on the weight coefficients g and the reference values obtained from the 3D-LUT.

FIG. 8 illustrates a state in which a three-dimensional input color space (an RGB space) is divided into unit cubes by dividing the space into limited numbers (8, here) along each axial direction. Post-color space conversion output values corresponding to input values that in turn correspond to the apexes of the unit cubes are stored in the 3D-LUT as reference values.

The most significant bits of the respective RGB components of the input pixel values are handled as color space coordinates, a unit cube to be used in the interpolation processing is selected (for example, a unit cube 1000, in FIG. 8), and the reference value corresponding to the vertex of the unit cube is used in the interpolation processing.

Tetrahedral interpolation can be employed as the three-dimensional interpolation processing method used at this time. As shown in FIGS. 9B to 9G, this interpolation method divides the unit cube (for example, the unit cube 1000 shown in FIG. 8) into six tetrahedrons, and performs the interpolation processing using the following formulas based on which tetrahedron that input coordinates belong to. The six tetrahedrons produced by the division will be called Type0 to Type5 hereinafter.

Figure 9A:
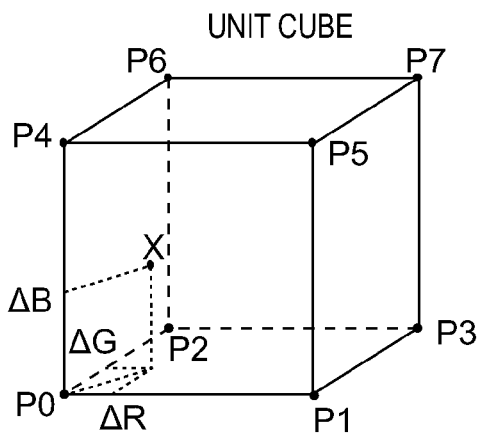
FIGS. 9A to 9G are diagrams illustrating tetrahedral interpolation, serving as an example of a three-dimensional interpolation calculation.
Figure 9B:
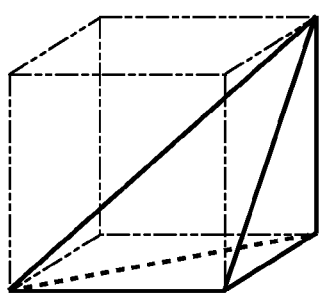
Figure 9C:
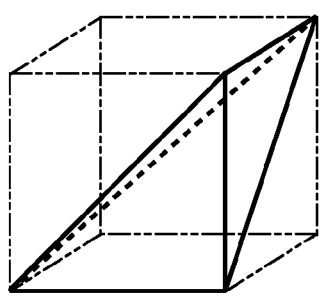
Figure 9D:
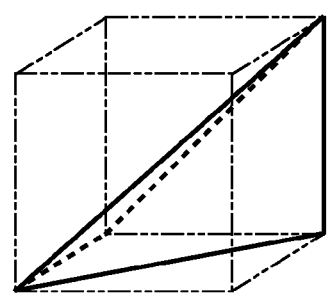
Figure 9E:
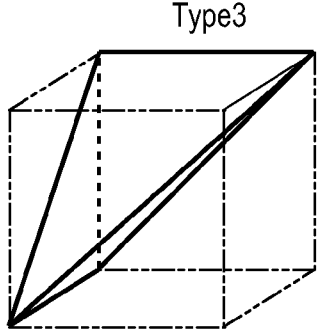
Figure 9F:
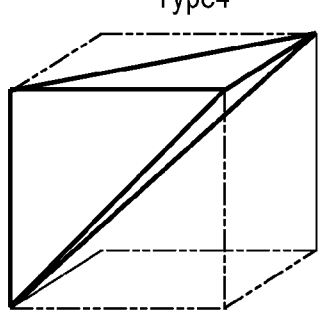
Figure 9G:
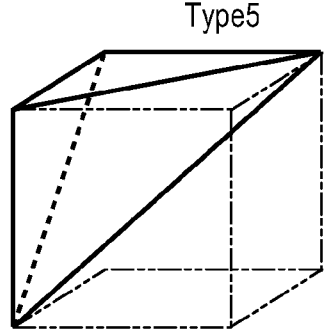

Note that in the following formulas, the reference values corresponding to the apexes of the unit cube shown in FIG. 9A are indicated by P0 to P7, respectively; of the weight coefficients g, the R least significant bit is indicated as $\Delta R$, the G least significant bit is indicated as $\Delta G$, and the B least significant bit is indicated as $\Delta B$. Furthermore, which of the Type0 to Type5 tetrahedrons will be selected is determined based on magnitude relationships between the weight coefficients $\Delta R$, $\Delta G$, and $\Delta B$.

When Type0 (ΔR>ΔG>ΔB)

$$X=P0+(P1-P0)\times\Delta R+(P3-P0)\times\Delta G+(P7-P0)\times\Delta B \quad \text{Formula 4}$$

When Type1 (ΔR>ΔB>ΔG)

$$X=P0+(P1-P0)\times\Delta R+(P7-P0)\times\Delta G+(P5-P0)\times\Delta B \quad \text{Formula 5}$$

When Type2 (ΔG>ΔR>ΔB)

$$X=P0+(P3-P0)\times\Delta R+(P2-P0)\times\Delta G+(P7-P0)\times\Delta B \quad \text{Formula 6}$$

When Type3 (ΔG>ΔB>ΔR)

$$X=P0+(P7-P0)\times\times R+(P2-P0)\times\Delta G+(P6-P0)\times\Delta B \quad \text{Formula 7}$$

When Type4 (ΔB>ΔR>ΔG)

$$X=P0+(P5-P0)\times\Delta R+(P7-P0)\times\Delta G+(P4-P0)\times\Delta B \quad \text{Formula 8}$$

When Type5 (ΔB>ΔG>ΔR)

$$X=P0+(P7-P0)\times\Delta R+(P6-P0)\times\Delta G+(P4-P0)\times\Delta B \quad \text{Formula 9}$$

In S104, the color processing unit 131 performs such a color space conversion process using the 3D-LUT, and ends the development process performed by the image processing unit 13.

Figure 10A:
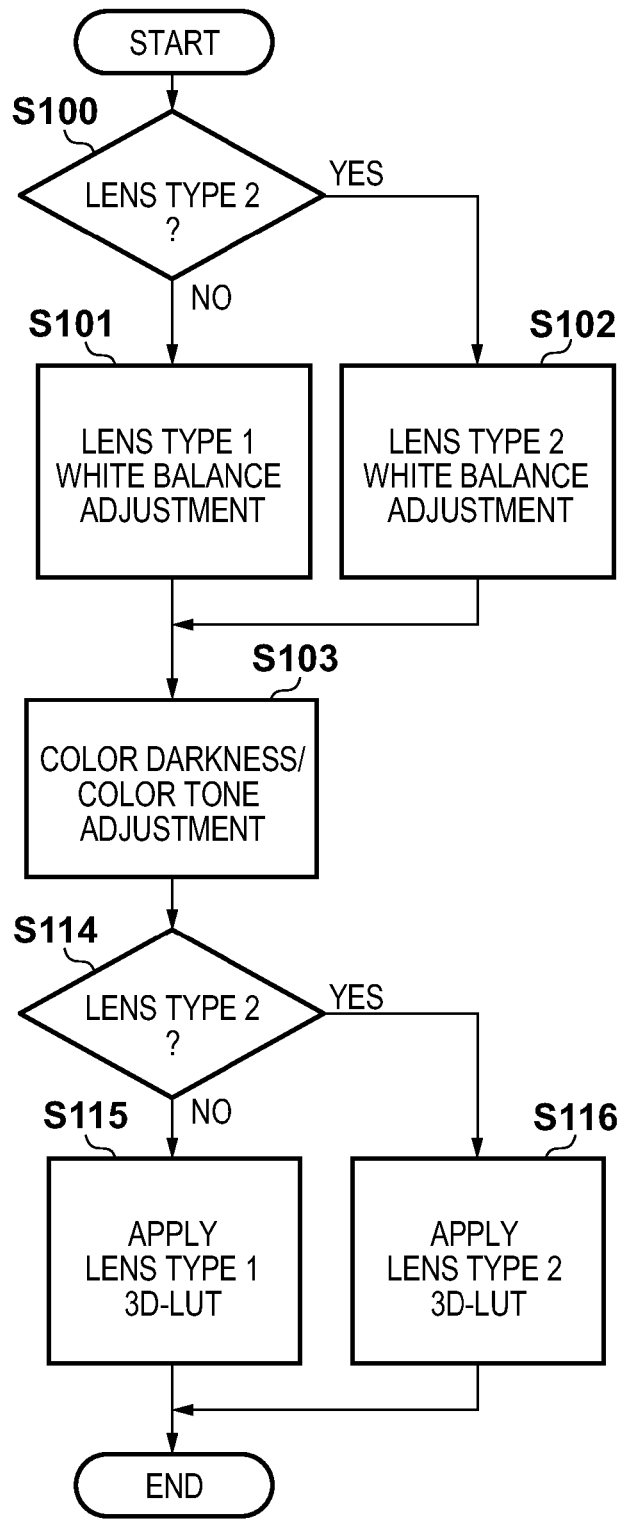
FIGS. 10A and 10B are flowcharts illustrating another example of a development process performed by the image processing unit according to the first embodiment of the present invention.

Another method for the development process performed by the image processing unit 13 will be described with reference to FIGS. 10A and 10B. FIG. 10A is a flowchart illustrating a development process in which 3D-LUTs are held for each lens type and the 3D-LUT is switched depending on the type of the interchangeable lens used in shooting. S100 to S103 are the same as the processing in FIG. 6. In S114, the color processing unit 131 determines the lens type of the interchangeable lens 100, and performs the color space conversion process using a 3D-LUT corresponding to the lens type in S115 and S116. The 3D-LUTs used here are prepared in advance, taking into consideration differences in color characteristics depending on the lens type. Switching the 3D-LUT that is used in accordance with the lens type makes it possible to more finely match the tint of images captured using interchangeable lenses having different color characteristics. This is because using a 3D-LUT makes it possible to change input/output characteristics based on colors.

Figures 11, 12:
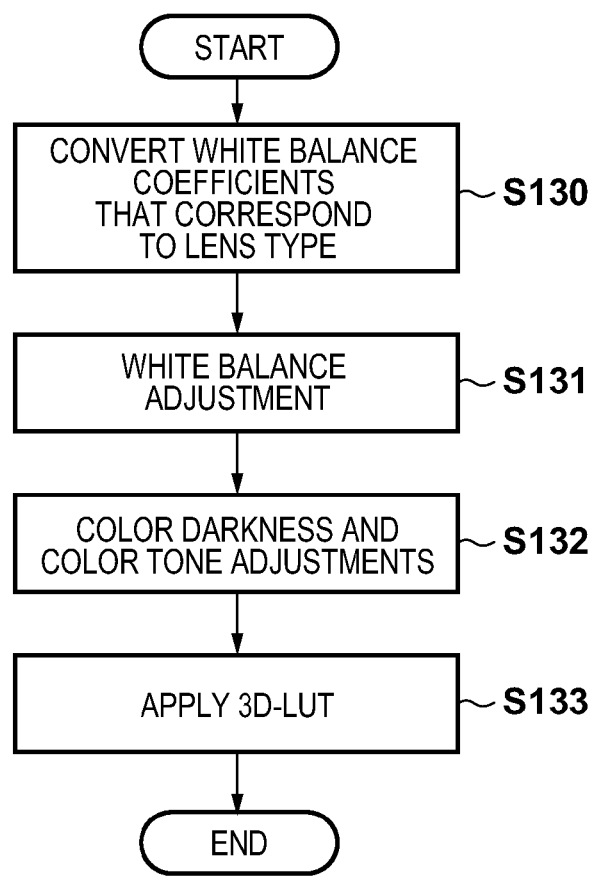
FIG. 11 is a diagram illustrating an example of the data structure of a 3D-LUT based on lens types, according to the first embodiment of the present invention.
FIG. 12 is a flowchart illustrating yet another example of a development process performed by the image processing unit according to the first embodiment of the present invention.

FIG. 11 illustrates an example of the data structure of 3D-LUTs compliant with different lens types. As can be seen here, a lens type 1 3D-LUT and a lens type 2 3D-LUT are prepared in advance in the memory 16. The 3D-LUTs can be expressed as a collection of post-change values corresponding to the respective apexes of the unit cube or respective grid points (R0, G0, B0)-(R7, G7, B7) in the 3D-LUT. A 3D-LUT that corresponds to the type of the interchangeable lens used in the shooting is employed. Note that a single block in the data structure shown in FIG. 11 indicates post-color space conversion color data at a single vertex in the unit cube shown in FIG. 8.

Furthermore, as illustrated in FIG. 6 and FIG. 10A, differences in the color cast resulting from the lens type are reduced by executing white balance processing in accordance with the lens type in S101 and S102. However, preparing a 3D-LUT for performing a color space conversion process that includes correcting such color cast differences makes it possible to absorb the differences in the color characteristics of the lenses simply by performing the color space conversion process that employs the 3D-LUT.

Figure 10B:
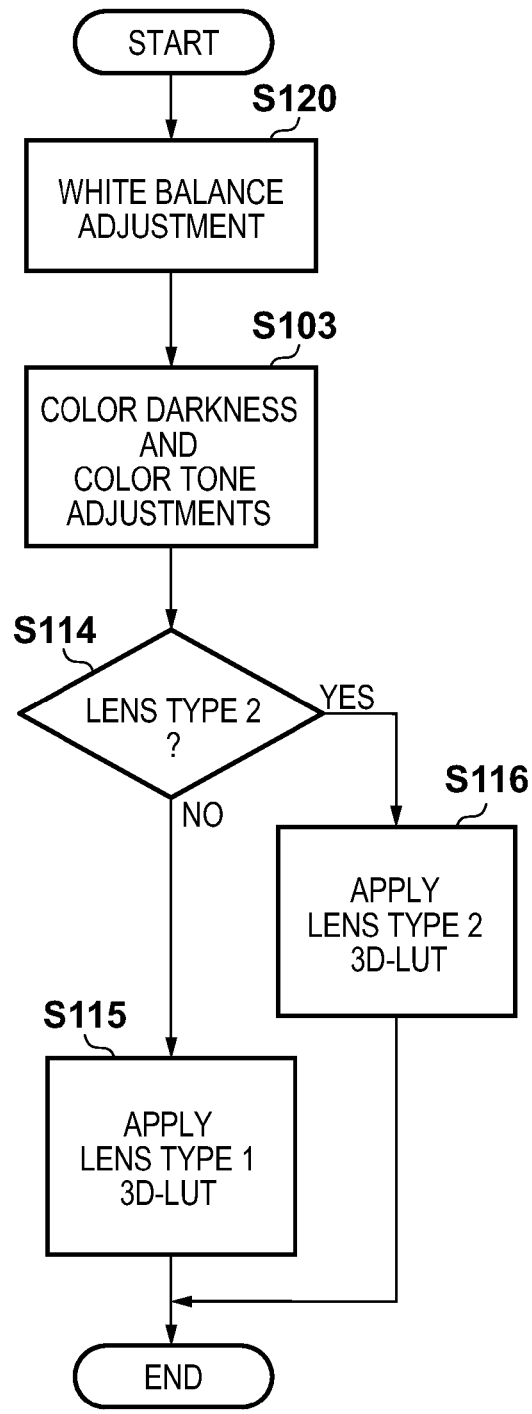

The flowchart in FIG. 10B illustrates the development process performed in such a case. In S120, the white balance processing unit 130 applies white balance adjustment that is independent of the lens type, and in S114 to S116, the color processing unit 131 performs the color space conversion process that employs a 3D-LUT corresponding to the lens type. The processing is the same as in S114 to S116 in FIG. 10A, but a different 3D-LUT is employed.

In this manner, changing the white balance processing, the 3D-LUT, or the like depending on the lens type makes it possible to reduce differences in the tints of images caused by differences in the color characteristics of the lenses.

Here, a configuration in which the white balance coefficients are switched in accordance with the lens type has been described as white balance processing based on the lens type. However, it is also possible to find white balance coefficients that are based on the lens type by converting shared white balance coefficients based on conversion coefficients computed in advance based on the spectral transmittances of the lenses. The white balance processing performed in this case will now be described using the flowchart shown in FIG. 12.

Prior to applying the white balance adjustment, in S130, the white balance processing unit 130 performs a conversion process on the white balance coefficients that correspond to the lens type. For example, assuming that the white balance coefficients prepared in the memory 16 correspond only to the lens type 1, adjustment values AdjR, AdjG, and AdjB for converting the lens type 1 white balance coefficients into the lens type 2 white balance coefficients are held in the memory 16. The conversions are carried out according to the following formulas.

Here, WbGainR1, WbGainG1, and WbGainB1 are white balance coefficients corresponding to the lens type 1 and held in the camera, whereas WbGainR2, WbGainG2, and WbGainB2 are converted white balance coefficients.

$$WbGainR2=AdjR\times WbGainR1 \quad \text{Formula 10}$$

$$WbGainG2=AdjG\times WbGainG1 \quad \text{Formula 11}$$

$$WbGainB2=AdjB\times WbGainB1 \quad \text{Formula 12}$$

These conversion coefficients can be found in advance based on the color characteristics resulting from the spectral transmittances of the lenses, so that the tints of the images after the white balance has been applied match.

By using conversion coefficients to find white balance coefficients for a given lens type from the white balance coefficients for another lens type in this manner, it is no longer necessary to hold white balance coefficients for each of the lens types. It is only necessary to hold conversion coefficients for each lens type in the case where there are several target lens types.

In addition, here, white balance adjustment based on the light source at the time of shooting has been described. However, it is also possible to perform the white balance adjustment corresponding to the lens type in the same manner, even in an auto white balance process ("AWB" hereinafter) that determines the white balance coefficients based on the captured image.

AWB is white balance adjustment that causes white subjects in images to appear white (that is, causes RGB values to match). Various methods have been proposed for AWB, and a method in which a white region is detected in an image and white balance coefficients are determined so that that region becomes white is known. When detecting a white region in an image, generally, a white detection region in which a range of color determined to be white is defined by a color space is provided, and a region composed of pixels having colors included in the white detection region is detected as the white region. In the case of lenses having different spectral transmittances, there are different distribution ranges in the color space when a white subject is shot, and thus switching the white detection region in accordance with the lens type makes it possible to implement AWB that reduces differences in tints resulting from differences in the spectral transmittances.

Figure 13A:
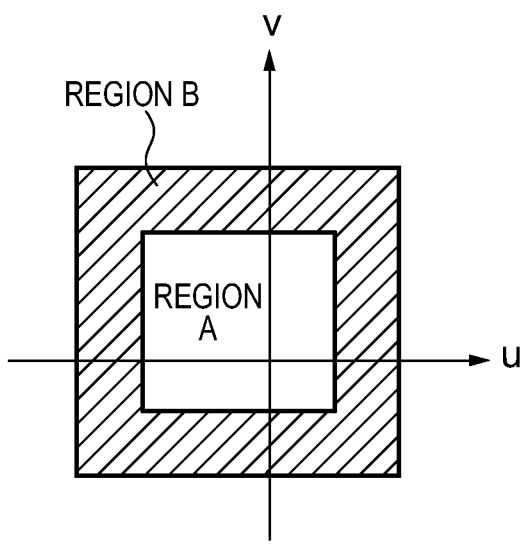
FIGS. 13A and 13B are diagrams illustrating examples of white detection range settings based on lens types, according to the first embodiment of the present invention.
Figure 13B:
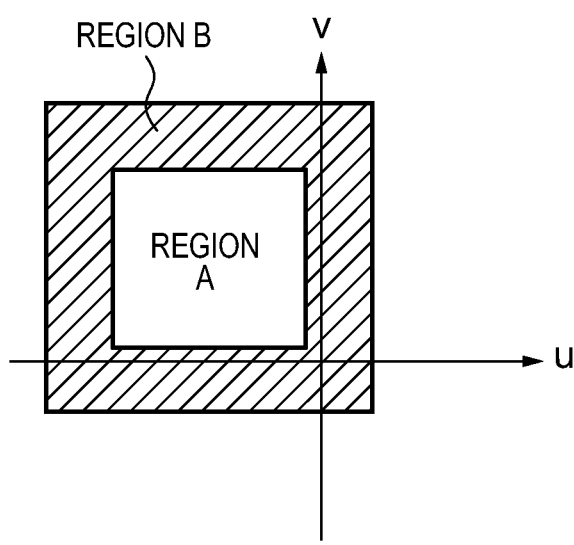

FIGS. 13A and 13B illustrate examples of setting a white detection range in accordance with the lens type. FIG. 13A illustrates an example of the white detection region for the lens type 1. The values (RGB) of the respective pixels that configure the pre-white balance adjustment input image are converted to values in the YUV color space, and the pixels whose UV values, which are the color components, are contained in a region A or a region B in FIG. 13A are treated as white pixels. All of the pixels contained in this white detection region are detected from the image, and the white balance coefficients are computed from the averages of the respective RGB values in the detected pixels. At this time, weighted average values, in which different weights have been applied to the pixels contained in the region A and the pixels contained in the region B, are used.

Specifically, the computation is carried out according to the following formulas. In these formulas, WbGainR, WbGainG, and WbGainB represent the respective computed white balance coefficients for RGB, and Ra, Ga, and Ba represent the averages of the respective RGB values in the pixels belonging to the region A in the white detection region. Meanwhile, Rb, Gb, and Bb represent the averages of the respective RGB values in the pixels belonging to the region B in the white detection region, and wA and wB represent the weights applied to the region A and the region B.

$$WbGainR = (Ga \times wA + Gb \times wB)/(Ra \times wA + Rb \times wB) \quad \text{Formula 13}$$

$$WbGainG = 1 \quad \text{Formula 14}$$

$$WbGainB = (Ga \times wA + Gb \times wB)/(Ba \times wA + Bb \times wB) \quad \text{Formula 15}$$

As the white detection region used in such AWB processing, the region shown in, for example, FIG. 13A is used in the case of the lens type 1, whereas the region shown in FIG. 13B is used in the case of the lens type 2. A white detection region suited to the color characteristics of a lens can be found experimentally from an image captured using that lens in advance. Specifically, the white detection range is set so that a range of subject colors contained in the white detection region in the case where an image is shot using a lens type 1 interchangeable lens matches a range of subject colors contained in the white detection region in the case where an image is shot using a lens type 2 interchangeable lens.

By setting the white detection range in this manner, subject regions handled as white subjects will be the same for both the lens type 1 and the lens type 2, and thus the AWB computation results will match. In the case where, for example, the white detection regions are not in the aforementioned relationship, subject regions that are viewed as white pixels in the AWB will differ, and as a result, the AWB computation results will not match. Accordingly, even if AWB is carried out using white detection regions on images shot using lenses having different color characteristics, the AWB results will not match. That converting such nonmatching white balance coefficients based on the spectral transmittances will produce results that do not match is clear based on the principles of AWB.

Information regarding the white detection regions corresponding to the lens types may be held as parameters for each lens type, but it is also possible to hold only a white detection region for a single lens type as parameters and compute the white detection regions for other lens types using the aforementioned conversion coefficients.

Next, a method for implementing a manual white balance function according to the present embodiment will be described. The manual white balance function is a function that registers, in a camera, white balance coefficients determined from data of an image captured of a subject that the user wishes to reproduce as white, and uses those white balance coefficients in the white balance adjustment.

The white balance coefficients registered in the camera can be used even if the lens is changed. Accordingly, in the case where the lens used when shooting an image for registering the manual white balance coefficients is different from a lens used to shoot an image thereafter having applied the manual white balance coefficients, there are cases where whites cannot be reproduced correctly. To avoid such a situation, the image capture apparatus according to the present embodiment registers the manual white balance coefficients by performing a process such as that shown in FIGS. 14A and 14B.

In S140, the white balance processing unit 130 finds average values R, G, and B for the respective RGB values, for pixels in a predetermined region near the center of an image of a white subject captured for white balance coefficient registration. Manual white balance coefficients WbGainR, WbGainG, and WbGainB are then found from the average values using the following formulas.

$$WbGainR = G/R \quad \text{Formula 16}$$

$$WbGainG = 1 \quad \text{Formula 17}$$

$$WbGainB = G/B \quad \text{Formula 18}$$

In this manner, the white balance processing unit 130 finds the white balance coefficients for reproducing a subject region that the user wishes to be white as white, by using the RGB values of pixels contained in a region near the center of the image.

In S141, the white balance processing unit 130 determines the type of the lens used to shoot the image used in the white balance coefficient registration, and the processing advances to S142 in the case of the lens type 2.

In S142, the white balance processing unit 130 performs the following conversion processes on the computed manual white balance coefficients, using the conversion coefficients AdjR, AdjG, and AdjB. Here, WbGainR', WbGainG', and WbGainB' represent the post-conversion white balance coefficients.

$$WbGainR' = WbGainR/AdjR \quad \text{Formula 19}$$

$$WbGainG' = WbGainG/AdjG \quad \text{Formula 20}$$

$$WbGainB' = WbGainB/AdjB \quad \text{Formula 21}$$

These conversion coefficients can be found in advance based on the color characteristics resulting from the spectral transmittances of the lenses, as values that result in the tints of the post-manual white balance adjustment images matching.

In S143, the white balance processing unit 130 registers the post-conversion process white balance coefficients in the camera 10 by storing those coefficients in the memory 16.

In other words, white balance coefficients corresponding to the lens type 1 are always registered in the manual white balance coefficients.

FIG. 14B is a flowchart illustrating operations performed in a white balance adjustment process using the registered manual white balance coefficients. First, in S150, the white balance processing unit 130 reads out the manual white balance coefficients stored in the memory 16. Next, in S151, the white balance processing unit 130 determines the lens type of the interchangeable lens 100 used to shoot an image for white balance adjustment, and in the case where the lens type is the lens type 2, converts the white balance coefficients in S152.

The conversion coefficients AdjR, AdjG, and AdjB used here have the same values as the conversion coefficients used to convert the white balance coefficients corresponding to the lens type 2 into white balance coefficients corresponding to the lens type 1 during the manual white balance coefficient registration. In other words, the white balance coefficients corresponding to the lens type 2 are found through the following formulas.

$$WbGainR = AdjR \times WbGainR' \quad \text{Formula 22}$$

$$WbGainG = AdjG \times WbGainG' \quad \text{Formula 23}$$

$$WbGainB = AdjB \times WbGainB' \quad \text{Formula 24}$$

In other words, the manual white balance coefficients that correspond to the lens type 1 are registered, and thus the white balance coefficients are converted into values corresponding to the lens type 2 in the case where white balance adjustment is to be applied to an image captured by the interchangeable lens 100 of the lens type 2. In S153, the white balance processing unit 130 performs white balance adjustment using the manual white balance coefficients that correspond to the lens type.

By converting the white balance coefficients that correspond to the lens type during the manual white balance registration and during shooting in this manner, it is possible to implement a manual white balance function for reproducing whites correctly regardless of the lens type.

Although the present embodiment has described the interchangeable lens 100 as being one of two types, namely the lens type 1 and the lens type 2, in order to facilitate understanding of the invention and simplify the descriptions, it should be noted that the invention can be applied in the same manner even in the case where there are three or more lens types. The present embodiment employs a method in which the parameters that are used are switched, converted, or the like in accordance with the lens type, and thus even if the number of target lens types increases, parameters corresponding to those lens types, or conversion coefficients for finding those parameters from other parameters, may simply be held.

Figure 15:
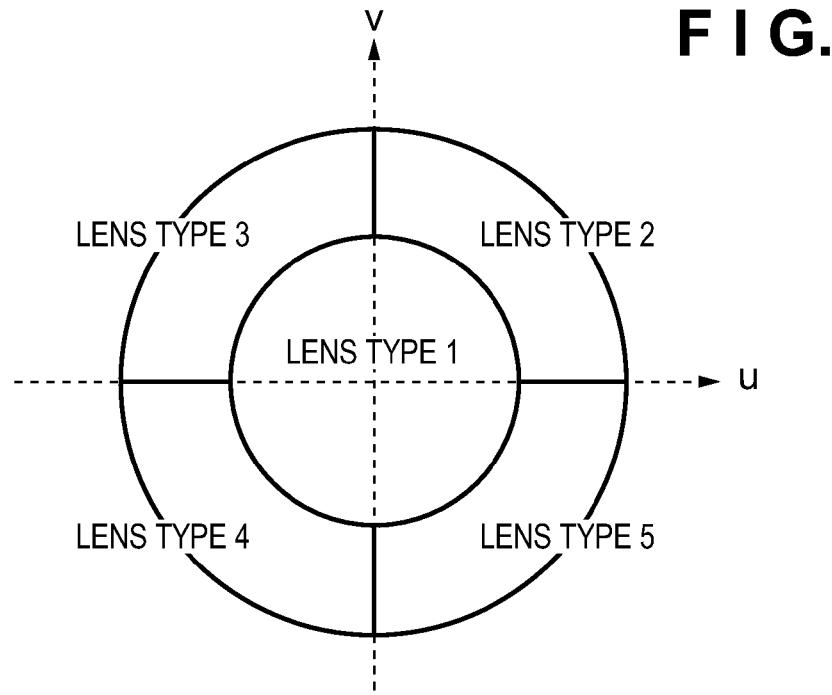
FIG. 15 is a diagram illustrating an example of a method for classifying lens types according to color characteristics resulting from the spectral transmittances of lenses, according to the first embodiment of the present invention.

When classifying lens types based on the color characteristics that result from the spectral transmittances of the lenses, it is also possible to classify the lens types into lens types 1 to 5 based on the color characteristics of the lenses (that is, based on which region of a color plane contains the color components resulting from capturing an image of a white subject), as shown in, for example, FIG. 15. Doing so makes it possible to reduce differences in the tints of images captured using lenses having a variety of color characteristics. Further classification may also be carried out based on the lens mount shape or the like.

As described above, according to the present embodiment, white balance adjustment, color space conversion processing, and the like are carried out in accordance with the types of interchangeable lenses that produce different tints. It is thus possible to suppress differences in the color characteristics of interchangeable lenses used in shooting from affecting the tints of the captured images. It is thus not only possible to obtain images having stable tints, but because various interchangeable lenses can be used without concern for differences in the tints produced by those interchangeable lenses, it is also possible to utilize lens resources more usefully.

Although the present embodiment has described a case in which the lens type determination, development processing, and so on is carried out by the image capture apparatus, it should be noted that the lens type determination may be performed using, for example, information recorded in the header of a captured image file. The development processing also need not be carried out within the image capture apparatus, and may be executed by a development application run on an information processing apparatus such as a personal computer. Thus the present embodiment can also be carried out by devices that do not have image capturing functions.

Second Embodiment

Next, a second embodiment of the present invention will be described. The present embodiment relates to image capture apparatuses and processes performed by development applications for performing development processes on RAW images captured by image capture apparatuses. A plurality of types of interchangeable lenses can be attached to an image capture apparatus, and white balance adjustment is performed in a development process carried out by a development application. The development application may be run in the camera 10, or may be run on an external device aside from the camera 10, such as a personal computer. Accordingly, the primary entity that performs the processing of the development application is the camera control unit 18 (the camera microcomputer 20) or a control unit (a CPU or the like) in the external device. Because known configurations can be used for the hardware (memories and the like) required to execute the development application, descriptions thereof will be omitted.

Figure 16:
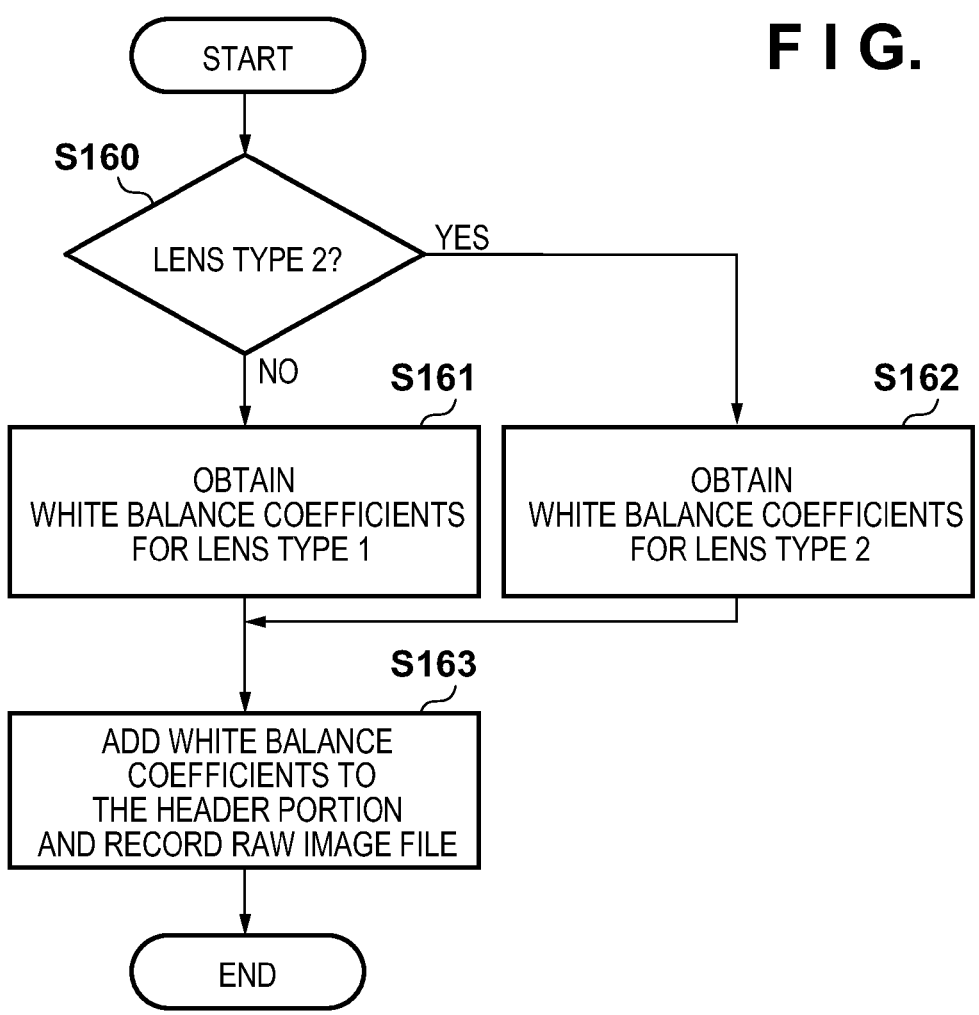
FIG. 16 is a flowchart illustrating characteristic elements of a RAW image generation process according to a second embodiment of the present invention.

The basic configuration of the image capture apparatus according to the present embodiment is the same as the image capture apparatus according to the first embodiment, and thus descriptions thereof will be omitted. FIG. 16 is a flowchart illustrating processes, in a RAW image generation process performed by the image capture apparatus according to the present embodiment, that are characteristic to the present embodiment. Because this is a RAW image generation process, white balance adjustment is not carried out; however, in S160, the camera control unit 18 determines the lens type, and in S161 and S162, the white balance processing unit 130 obtains the white balance coefficients that correspond to the lens type.

This lens type determination and obtainment of the white balance coefficients that correspond to the lens type can employ the same system as the development process described in the first embodiment. In other words, the same method for determining the lens type performed by the camera control unit 18, the same data structure of the white balance coefficient data in the memory 16, and so on employed during development can be applied as-is. Next, in S163, the image processing unit 13 saves, in the recording medium 15, a RAW image file in which the white balance coefficients obtained by the white balance processing unit 130 are added to a header area.

FIGS. 17A and 17B illustrate examples of information recorded in the header of the RAW image file, where FIG. 17A illustrates an example of a case in which an image has been captured by a lens type 1 interchangeable lens and FIG. 17B illustrates an example of a case in which an image has been captured by a lens type 2 interchangeable lens. The white balance coefficients corresponding to the lens type obtained by the white balance processing unit 130 in S161 and S162 are recorded as-is in a white balance coefficient recording region of the header. As illustrated in FIGS. 17A and 17B, white balance coefficients are recorded for a plurality of predetermined light source types.

The development application according to the present embodiment performs the white balance adjustment during the development process. At this time, the white balance coefficients that correspond to the lens type of the lens used to capture the image are recorded in the header portion of the RAW image file, and thus the development application can perform the white balance adjustment using the recorded white balance coefficients. In other words, the development application need not be concerned with the type of the lens used to capture the image. Note that because white balance coefficients for a plurality of light sources are recorded in the header portion, the development application can use the white balance coefficients recorded in the header in the case where the user has instructed the light source to be changed.

By recording the white balance coefficients that correspond to the lens types in the RAW image file in this manner, it is possible to use white balance coefficients specified by the image capture apparatus in the development process as well. In addition, the development application can obtain suitable white balance adjustment results without concern for the type of interchangeable lens with which an image is shot.

A typical development application includes a color cast correction function (manual white balance adjustment function) that performs white balance adjustment based on a region (pixels), specified by the user within the image, to be reproduced as white. The application also includes a function for applying (copying) the white balance coefficients computed by the manual white balance adjustment function in this manner to other images as well.

However, in the case where an image used to compute the manual white balance coefficients (called an image A) and another image to which these manual white balance coefficients are to be applied (called an image B) have been captured by lenses of different types, it is possible that whites will not be able to be suitably reproduced in the image B.

Accordingly, the image capture apparatus according to the present embodiment also records the following items in the header portion of the RAW image file, as indicated in FIGS. 17A and 17B:

information indicating the type of the lens used in the shooting; and conversion coefficients for finding the white balance coefficients that correspond to the type of the lens used in the shooting from the white balance coefficients recorded in the header portion.

Figure 18:
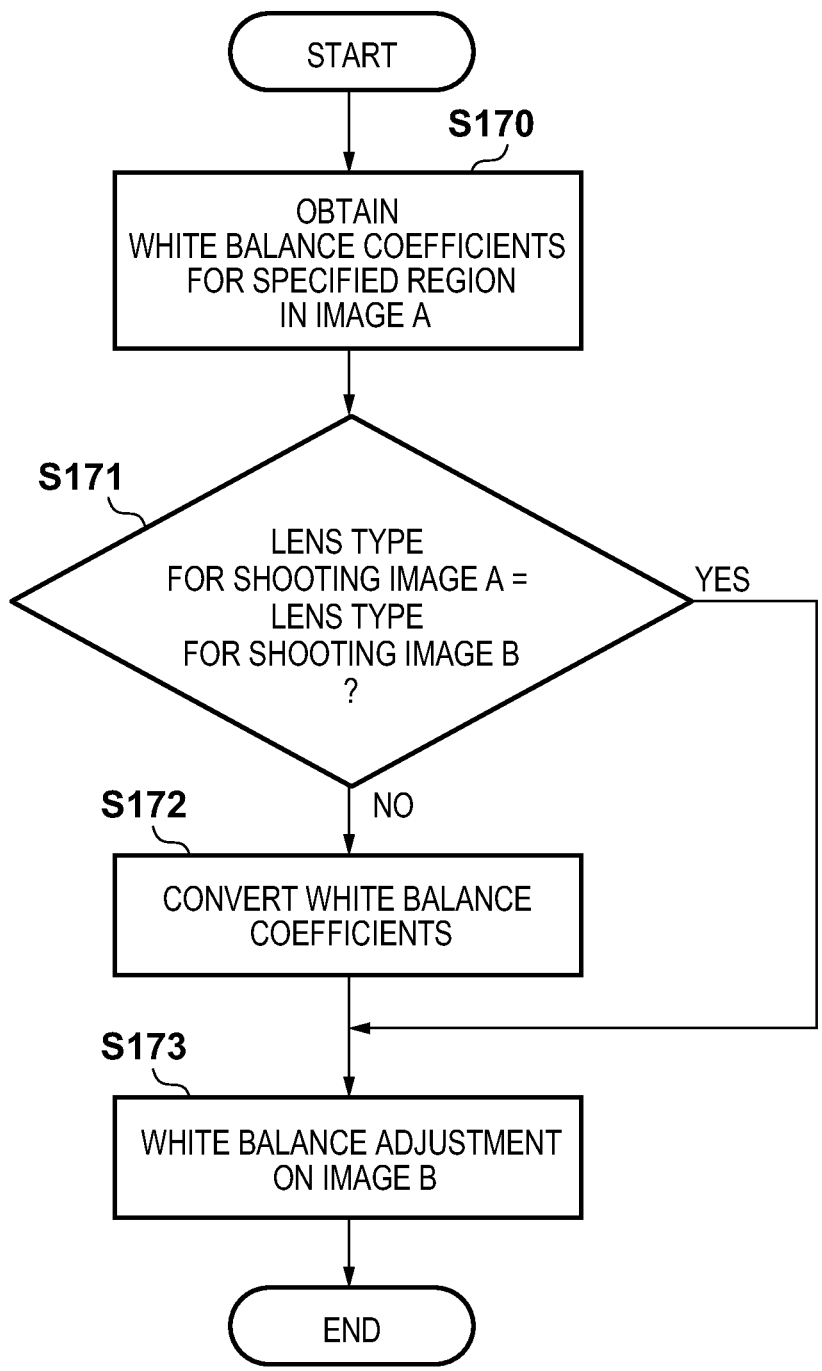
FIG. 18 is a flowchart illustrating a manual white balance coefficient inter-image copy process according to the second embodiment of the present invention.

FIG. 18 is a flowchart illustrating a manual white balance coefficient inter-image copy process performed by the development application according to the present embodiment. For the sake of simplicity, it is assumed that this process is executed by the development application in the camera 10.

In S170, the camera control unit 18 displays the image A, which serves as a copy origin, in a user interface along with a region (pixels) that is to be reproduced as white in the image A, in a manner that enables the user to specify the stated region. Then, using the white balance processing unit 130, white balance coefficients that result in the respective averages of the RGB values in the specified region matching are obtained through the same process as the aforementioned manual white balance adjustment process.

Next, in S171, the camera control unit 18 determines whether the type of the lens used to shoot the image A that serves as the copy origin matches the type of the lens used to shoot the image B that serves as a copy destination. Lens type information obtained at the time of the shooting and recorded in the header portion of the RAW image file is used in this determination. In the case where the lens types match, in S173, the white balance coefficients recorded in the header portion of the image A are applied as-is to the image B by the white balance processing unit 130. However, in the case where the lens types do not match, in S172, the camera control unit 18 performs processing according to the following formulas using conversion coefficients recorded in the header portion of the RAW image.

Here, the conversion coefficients of the image A serving as the copy origin are taken as AdjR0, AdjG0, and AdjB0, and the conversion coefficients of the image B serving as the copy destination are taken as AdjR1, AdjG1, and AdjB1. In addition, the manual white balance coefficients set in the image A are taken as WbGainR, WbGainG, and WbGainB, and the post-conversion white balance coefficients are taken as WbGainR', WbGainG', and WbGainB'.

$$WbGainR'=(AdjR1/AdjR0) \times WbGainR \quad \text{Formula 25}$$

$$WbGainG'=(AdjG1/AdjG0) \times WbGainG \quad \text{Formula 26}$$

$$WbGainB'=(AdjB1/AdjB0) \times WbGainB \quad \text{Formula 27}$$

Then, in S173, the camera control unit 18 performs the white balance adjustment using the white balance processing unit 130 by applying the post-conversion white balance coefficients to the image B.

In this manner, according to the present embodiment, when the image capture apparatus generates a RAW image file, the white balance coefficients that correspond to the type of the interchangeable lens used to shoot the image are obtained and recorded in the RAW image file. It is thus possible to obtain images having tints that do not depend on the lens types, without concern for the type of the lens used to shoot the images.

The image capture apparatus according to the present embodiment also records conversion coefficients, for obtaining the white balance coefficients corresponding to other lens types from the white balance coefficients recorded in the RAW image file, in that RAW image file. Accordingly, when applying the manual white balance coefficients computed by the development application to other images, the same white balance adjustment results can be obtained even if the types of the lenses used to shoot the respective images do not match.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-160942, filed on Jul. 19, 2012, which is hereby incorporated by reference herein its entirety.

What is claimed is:

1. An image processing apparatus comprising:
a programmable processor;
a memory that stores a program causes, when executed, the programmable processor to function as:

a determination unit adapted to determine a type of an interchangeable lens used to shoot an image from a plurality of types of interchangeable lenses having different color characteristics; and an image processing unit adapted to apply white balance adjustment, wherein the image processing unit reduces the influence of differences in the color characteristics of the interchangeable lenses on the tint of the image by setting white balance coefficients used in the white balance adjustment to correspond to the type of the interchangeable lens used to shoot the image, and wherein the image processing unit computes the white balance coefficients used in the white balance adjustment based on a white region detected from the image using a white detection range that corresponds to the type of the interchangeable lens used to shoot the image.

2. An image processing apparatus comprising:

a programmable processor;

a memory that stores a program causes, when executed, the programmable processor to function as:

a determination unit adapted to determine a type of an interchangeable lens used to shoot an image from a plurality of types of interchangeable lenses having different color characteristics; and an image processing unit adapted to apply white balance adjustment, wherein the image processing unit reduces the influence of differences in the color characteristics of the interchangeable lenses on the tint of the image by setting white balance coefficients used in the white balance adjustment to correspond to the type of the interchangeable lens used to shoot the image, wherein white balance coefficients computed based on an image of a white subject or a white region specified in an image are registered in the image processing apparatus; and the image processing unit:

performs the white balance adjustment using the registered white balance coefficients in the case where the type of the interchangeable lens used to shoot the image used in the registration of the white balance coefficients is the same as the type of the interchangeable lens used to shoot the image on which the white balance adjustment is to be carried out; and performs the white balance adjustment using white balance coefficients obtained by applying, to the registered white balance coefficients, conversion coefficients based on differences in the color characteristics resulting from the type of the interchangeable lenses in the case where the type of the interchangeable lens used to shoot the image used in the registration of the white balance coefficients is different from the type of the interchangeable lens used to shoot the image on which the white balance adjustment is to be carried out.

3. The image processing apparatus according to claim 1, wherein the image processing unit records the image along with the white balance coefficients that correspond to the type of the interchangeable lens used to shoot the image.

4. The image processing apparatus according to claim 3, wherein the image processing unit further records information indicating the type of the interchangeable lens used to shoot the image along with the image.

5. The image processing apparatus according to claim 1, wherein the image processing apparatus is an image capture apparatus to which a plurality of types of interchangeable lenses having different color characteristics can be attached; and the determination unit determines the type of an interchangeable lens that has been attached.

6. A control method for an image processing apparatus, comprising:

determining a type of an interchangeable lens used to shoot an image from a plurality of types of interchangeable lenses having different color characteristics; and applying white balance adjustment, wherein the applying reduces the influence of differences in the color characteristics of the interchangeable lenses on the tint of the image by setting white balance coefficients used in the white balance adjustment to correspond to the type of the interchangeable lens used to shoot the image, and wherein the applying comprises computing the white balance coefficients used in the white balance adjustment based on a white region detected from the image using a white detection range that corresponds to the type of the interchangeable lens used to shoot the image.

7. A non-transitory computer-readable recording medium storing a computer program that causes a computer to function as an image processing apparatus comprising:

a determination unit adapted to determine a type of an interchangeable lens used to shoot an image from a plurality of types of interchangeable lenses having different color characteristics; and an image processing unit adapted to apply white balance adjustment, wherein the image processing unit reduces the influence of differences in the color characteristics of the interchangeable lenses on the tint of the image by setting white balance coefficients used in the white balance adjustment to correspond to the type of the interchangeable lens used to shoot the image, and wherein the image processing unit computes the white balance coefficients used in the white balance adjustment based on a white region detected from the image using a white detection range that corresponds to the type of the interchangeable lens used to shoot the image.

8. The image processing apparatus according to claim 1, wherein a determination unit adapted to determine a type of an interchangeable lens used to shoot an image based on a voltage at a terminal of the interchangeable lens.

* * * * *